US012197169B2

(12) United States Patent
Nakamura et al.

(10) Patent No.: US 12,197,169 B2

(45) Date of Patent: Jan. 14, 2025

(54) ELECTROSTATIC CHARGE IMAGE DEVELOPING TONER, METHOD FOR PRODUCING ELECTROSTATIC CHARGE IMAGE DEVELOPING TONER, ELECTROSTATIC CHARGE IMAGE DEVELOPER, TONER CARTRIDGE, PROCESS CARTRIDGE, AND IMAGE FORMING APPARATUS

(71) Applicant: FUJIFILM Business Innovation Corp., Tokyo (JP)

(72) Inventors: Yukiaki Nakamura, Minamiashigara (JP); Daisuke Noguchi, Minamiashigara (JP); Masaru Takahashi, Minamiashigara (JP); Kazuhiko Nakamura, Minamiashigara (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 33 days.

(21) Appl. No.: 17/404,729

(22) Filed: Aug. 17, 2021

(65) Prior Publication Data

US 2022/0373905 A1 Nov. 24, 2022

(30) Foreign Application Priority Data

May 21, 2021 (JP) ................................ 2021-086312

(51) Int. Cl.

| | |
|---|---|
| ***G03G 9/08*** | (2006.01) |
| ***G03G 9/087*** | (2006.01) |
| ***G03G 9/093*** | (2006.01) |
| ***G03G 9/107*** | (2006.01) |

(52) U.S. Cl.

CPC ......... *G03G 9/0823* (2013.01); *G03G 9/0804* (2013.01); *G03G 9/08728* (2013.01);

(Continued)

(58) Field of Classification Search

None

See application file for complete search history.

(56) References Cited

U.S. PATENT DOCUMENTS 4,443,527 A * 4/1984 Heikens ............... G03G 9/0926 428/407

2008/0063970 A1* 3/2008 Kikawa ............. G03G 9/09357 430/110.2

(Continued)

FOREIGN PATENT DOCUMENTS

JP 2009-163026 A 7/2009

JP 2010-090355 A 4/2010

(Continued)

OTHER PUBLICATIONS

KR 20170017721 A Translation (Year: 2023).*

(Continued)

*Primary Examiner* — Peter L Vajda

*Assistant Examiner* — Charles Collins Sullivan, IV

(74) *Attorney, Agent, or Firm* — Oliff PLC

(57) ABSTRACT

An electrostatic charge image developing toner includes a toner particle, and the toner particle includes: a core particle containing a large-diameter particle having a number average particle diameter of 1 μm or more; and a shell layer that includes at least two resin layers each containing an amorphous resin and covers a surface of the core particles, and an outermost layer of the at least two resin layers is a resin layer being made of the amorphous resin.

16 Claims, 2 Drawing Sheets

(52) U.S. Cl.
CPC ..... *G03G 9/08782* (2013.01); *G03G 9/09328* (2013.01); *G03G 9/09371* (2013.01); *G03G 9/108* (2020.08)

(56) References Cited

U.S. PATENT DOCUMENTS

| | | | | |
|---|---|---|---|---|
| 2010/0330487 | A1* | 12/2010 | Veregin | G03G 9/08797 430/108.7 |
| 2011/0159424 | A1* | 6/2011 | Choi | G03G 9/0926 430/97 |
| 2016/0200922 | A1 | 7/2016 | Sugamoto et al. | |
| 2018/0059563 | A1* | 3/2018 | Nakamura | G03G 9/0902 |

FOREIGN PATENT DOCUMENTS

| | | | |
|---|---|---|---|
| JP | 2014-206610 | A | 10/2014 |
| JP | 2016-20968 | A | 2/2016 |
| JP | 2016-139053 | A | 8/2016 |
| JP | 6011428 | B2 | 10/2016 |
| JP | 2018-21956 | A | 2/2018 |
| JP | 2018-072417 | A | 5/2018 |
| JP | 2018-097052 | A | 6/2018 |
| JP | 6597577 | B2 | 10/2019 |
| KR | 20170017721 | A * | 2/2017 |

OTHER PUBLICATIONS

Feb. 14, 2022 Extended Search Report issued in European Patent Application No. 21195278.3.

Sep. 5, 2023 Office Action issued in European Patent Application No. 21195278.3.

Mar. 18, 2024 Office Action issued in European Patent Application No. 21 195 278.3.

Sep. 17, 2024 Office Action issued in Japanese Application No. 2021-086312.

* cited by examiner

ELECTROSTATIC CHARGE IMAGE DEVELOPING TONER, METHOD FOR PRODUCING ELECTROSTATIC CHARGE IMAGE DEVELOPING TONER, ELECTROSTATIC CHARGE IMAGE DEVELOPER, TONER CARTRIDGE, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2021-086312 filed on May 21, 2021.

BACKGROUND

Technical Field

The present invention relates to an electrostatic charge image developing toner, a method for producing an electrostatic charge image developing toner, an electrostatic charge image developer, a toner cartridge, a process cartridge, and an image forming apparatus.

Related Art

JP-A-2018-097052 discloses an electrostatic latent image developing toner including plural toner particles each including a core containing a binder resin and a releasing agent and a multilayer shell layer partially covering a surface of the core, the multilayer shell layer including a first shell layer containing a first polymer containing a repeating unit having an oxazoline group, a second shell layer containing a second polymer containing a repeating unit having a carboxyl group, a third shell layer containing a third polymer containing a repeating unit having an oxazoline group, in which the first shell layer, the second shell layer, and the third shell layer have a laminated structure in which the first shell layer, the second shell layer, and the third shell layer are laminated in this order from the core side, and the second shell layer is in contact with a region of a surface region of the core that is not covered with the first shell layer.

JP-A-2014-206610 discloses an electrostatic charge image developing toner including toner particles having a multilayer structure in which an intermediate layer is formed on a surface of a core particle and a shell layer is laminated on the intermediate layer, in which the core particle is formed by dispersing a crystalline polyester resin as a domain phase in a matrix phase of a vinyl polymer A, the domain phase has an average diameter of 300 nm or less, and the intermediate layer contains a vinyl polymer B, and the shell layer contains an amorphous resin in which a vinyl-based polymer segment and a polyester polymer segment are chemically bonded to each other.

JP-A-2009-163026 discloses an electrostatic latent image developing toner having a core-shell structure in which a core particle containing at least a resin and a colorant is coated with a shell layer, and the shell layer does not contain a wax, and a difference (ΔSP) between solubility parameter value (SP values) of the core particle and that of the shell layer is 0.2 to 0.7.

SUMMARY

In recent years, there is an increasing demand for printing using “special color” in coupons, discount tickets, certificates, or the like, anti-counterfeit technology for expressing ruled lines, illustrations or the like by arranging fine micro-characters that cannot be read by a naked eye, and the like.

However, in a case where a toner containing large-diameter particles such as scaly pigments and large-diameter light-emitting particles as a color material of a special color is used, it may be difficult to obtain good electrical characteristics and powder fluidity, and it may be difficult to obtain fine line reproducibility.

Aspects of non-limiting embodiments of the present disclosure relate to providing an electrostatic charge image developing toner including a toner particle containing a shell layer and a core particle containing a large-diameter particle having a number average particle diameter of 1 μm or more, the electrostatic charge image developing toner giving high fine line reproducibility as compared with a case where the shell layer is composed of only one resin layer or a case where the shell layer includes at least two resin layers and the outermost layer includes a releasing agent.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

The present disclosure includes the following aspects.

According to an aspect of the present disclosure, there is provided an electrostatic charge image developing toner, including a toner particle, the toner particle including:

a core particle containing a large-diameter particle having a number average particle diameter of 1 μm or more; and a shell layer that includes at least two resin layers each containing an amorphous resin and covers a surface of the core particle, an outermost layer of the at least two resin layers being a resin layer consisting of the amorphous resin.

BRIEF DESCRIPTION OF THE DRAWINGS

Exemplary embodiment(s) of the present invention will be described in detail based on the following figures, wherein.

DETAILED DESCRIPTION

Figure 1:
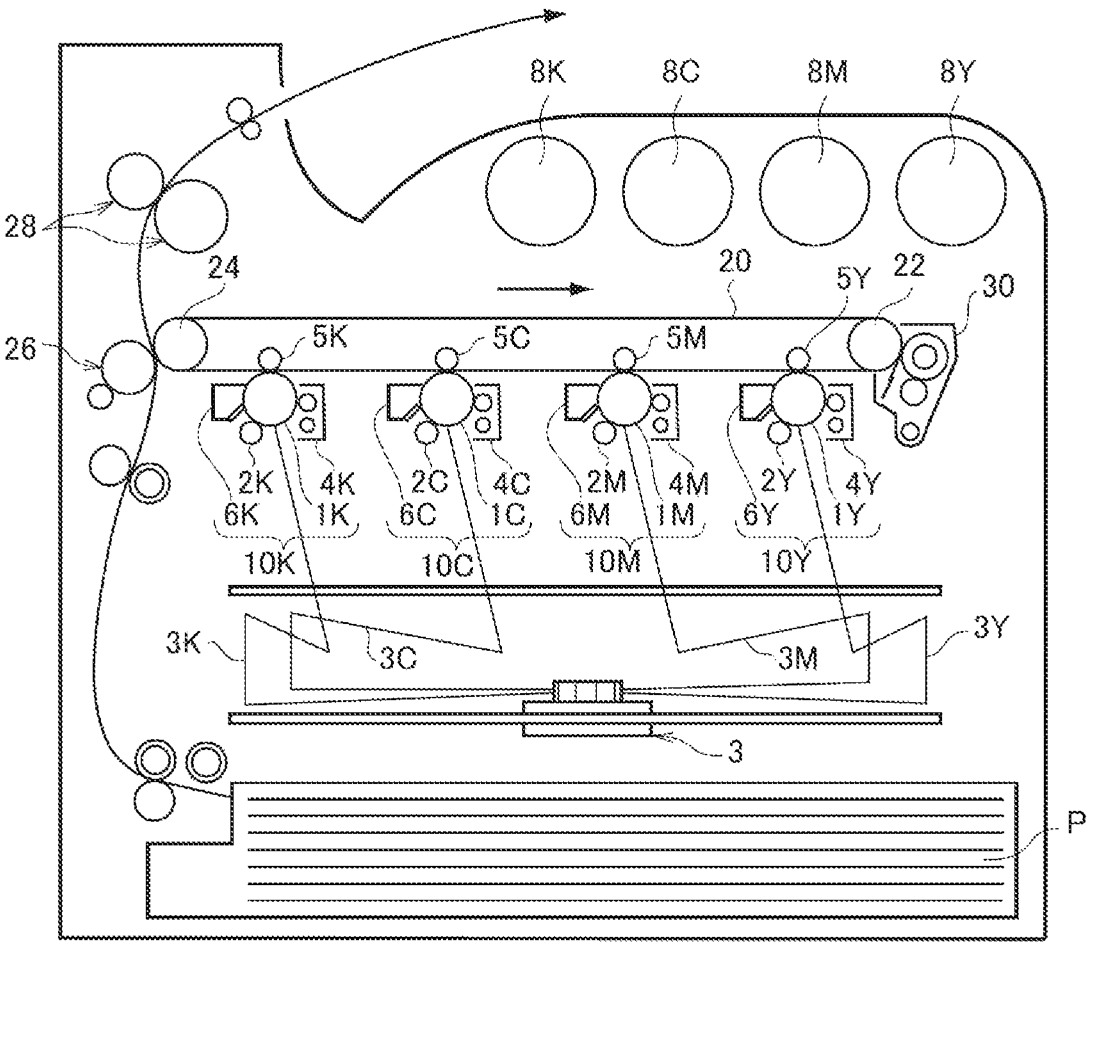
FIG. 1 is a schematic configuration diagram showing an image forming apparatus according to the exemplary embodiment.

Hereinafter, an exemplary embodiment as an example of the present invention will be described. The descriptions and Examples illustrate the exemplary embodiment, and do not limit the scope of the invention.

In the numerical ranges described in stages in the present description, an upper limit or a lower limit described in one numerical range may be replaced with an upper limit or a lower limit of the numerical range described in other stages. Further, in the numerical ranges described in the present description, the upper limit or the lower limit of the numerical range may be replaced with values shown in Examples.

Each component may contain plural corresponding substances.

In a case of referring to an amount of each component in a composition, in a case where there are plural substances corresponding to each component in the composition, unless otherwise specified, it refers to a total amount of the plural substances present in the composition.

<Electrostatic Charge Image Developing Toner>

The electrostatic charge image developing toner according to the exemplary embodiment (hereinafter, the electrostatic charge image developing toner may be also referred to as "toner") includes a toner particle including a core particle containing a large-diameter particle having a number average particle diameter of 1 μm or more (hereinafter, may be simply referred to as "large-diameter particle") and a shell layer that includes at least two resin layers each containing an amorphous resin and covers a surface of the core particle. Then, the shell layer includes a resin layer consisting of the amorphous resin as the outermost layer of the at least two resin layers.

Since the toner according to the exemplary embodiment has the above-described configuration, fine line reproducibility is improved. The reason is presumed as follows.

In a case where the resin layer is formed by attaching the amorphous resin particle to the core particle containing the large-diameter particle having a number average particle diameter of 1 μm or more, the amorphous resin particle may be less likely to be attached to the surfaces of the core particle.

In particular, in the case where the core particle contains the large-diameter particle, more resins are required to be attached to the core particle than the case where the core particle does not contain the large-diameter particle. Therefore, for example, in a case w amorphous resin particles are added to the dispersion liquid of the core particle, the concentration of the amorphous resin particle in the dispersion liquid is increased by adding many amorphous resin particles, and the amorphous resin particles are easily aggregated. Then, a resin single particle not containing the core particle may be formed, and a toner particle in which the surface of the core particle is not completely covered with the resin layer and is exposed may be formed. Since the toner particles in which the surfaces of the core particles are exposed have low chargeability, when there is variation in coverage of the resin layer on the surfaces of the core particles, the charge distribution may become wide, scattering of the toner may occur, and deterioration of fine line reproducibility (for example, collapse of micro characters) may occur.

In contrast, in the exemplary embodiment, the shell layer includes at least two resin layers, and the outermost layer of the shell layer consists of an amorphous resin.

That is, in the toner particle according to the exemplary embodiment, the core particle is coated with the resin layer through at least two-stage steps. For example, in a case where the resin layer is formed on the surface of the core particle by adding the amorphous resin particle to the dispersion liquid of the core particle, by passing through the steps of at least two stages, the concentration of the amorphous resin particles in the dispersion liquid is reduced as compared with a case where the resin layer having the same mass is formed on the surface of the core particle in one stage. Therefore, it is considered that the adhesion of the amorphous resin particles to the surfaces of the core particles is more likely to occur instead of the aggregation of the amorphous resin particles, and the formation of the resin single particle is prevented, and the coverage of the resin layer on the surface of the core particle is increased. In addition, since the coverage of the resin layer on the surface of the core particle is high, a decrease in chargeability due to exposure of the surface of the core particle is prevented, and fine line reproducibility is improved.

On the other hand, even in the case where the toner particle includes a shell layer composed of at least two resin layers, when the outermost layer of the shell layer contains a releasing agent, aggregation of the toner particles may occur to widen the particle size distribution, and variation in electrical characteristics may occur, and the fine line reproducibility may be reduced. Similarly, in a case where the outermost layer of the shell layer contains a crystalline resin, the fine line reproducibility may decrease due to aggregation of the toner particles.

In contrast, in the exemplary embodiment, the shell layer includes at least two resin layers, and the outermost layer of the shell layer consists of the amorphous resin. Therefore, it is considered that a decrease in fine line reproducibility due to aggregation of the toner particles is prevented.

For the above reasons, it is presumed that the toner according to the exemplary embodiment gives high fine line reproducibility.

Hereinafter, the toner according to the exemplary embodiment will be described in detail.

The toner according to the exemplary embodiment includes a toner particle and, if necessary, an external additive.

<Toner Particle>

The toner particle includes a core particle containing a large-diameter particle having a number average particle diameter of 1 μm or more, and a shell layer that includes at least two resin layers and covers a surface of the core particle.

(Core Particle)

The core particle includes at least a large-diameter particle. Examples of the core particle include a core particle in which one core particle consists of one large-diameter particle (hereinafter, also referred to as "single core particle"), and a core particle in which one core particle contains at least two large-diameter particles and an amorphous resin (hereinafter, also referred to as "composite core particle").

—Single Core Particle—

One single core particle consists of one large-diameter particle.

In a case where a single core particle is used as the core particle, the function of the large-diameter particle is more likely to be exhibited as compared with the case where a composite core particle is used. For example, in a case where a brilliant pigment described later is used as the large-diameter particle, an image having high brilliance is easily obtained by using a single core particle as the core particle. Specifically, in a case where one core particle contains at least two brilliant pigments, the at least two brilliant pigments have different orientation planes from each other, and the brilliance of the obtained image may decrease, but in the case of using the single core particle, the decrease in the brilliance is easily prevented.

—Composite Core Particle—

The composite core particles are not limited as long as the composite core particle contains at least two large-diameter particles and an amorphous resin.

In a case where the composite core particle is used as the core particle, there is an advantage that the smoothness of the fixed toner image is improved as compared with the case where the single core particle is used. Although the reason for this is not clear, it is presumed that in the composite core particle, a size per large-diameter particle is relatively small relative to the size of the toner particle, and the core particle itself contains the amorphous resin, and therefore unevenness of the surface is less likely to occur during the fixing.

The number of the large-diameter particles contained in the composite core particle is 2 or more, and may be in a range of 2 to 10, and is preferably in a range of 3 to 8, and more preferably in a range of 3 to 6, from a viewpoint of achieving both low-temperature fixability and bending strength of an image.

The content of the large-diameter particles relative to a whole of the composite core particle may be 50 mass % or more, and is preferably 50 mass % or more and 90 mass % or less, and more preferably 50 mass % or more and 70 mass % or less. In the case where the content of the large-diameter particles is within the above range, a function of the large-diameter particles is more likely to be exhibited as compared with the case where the content of the large-diameter particles is less than the above range. For example, in a case where a brilliant pigment described below is used as the large-diameter particles and the content of the large-diameter particles is in the above-described range, an image having high brilliance is easily obtained. In the case where the content of the large diameter-particles is in the above range, there is an advantage that deterioration of charging characteristics caused by exposure of the large-diameter particles due to a load caused by stirring or the like in the developing unit is prevented, and charging maintainability is improved, as compared with a case where the content of the large-diameter particles exceeds the above range.

The composite core particles may contain components other than the large-diameter particles and the amorphous resin as necessary. Examples of the other components contained in the composite core particle include a releasing agent, a crystalline resin, a colorant, and other additives.

In addition to the large-diameter particles and the amorphous resin, the composite core particle may contain at least one selected from the group consisting of releasing agents, crystalline resins, and colorants, and preferably contains at least one selected from the group consisting of releasing agents and crystalline resins, and more preferably contains a releasing agent.

In a case where the composite core particle containing the releasing agent is used as the core particle, low-temperature fixability of the toner is easily obtained as compared with a case where the releasing agent is not contained.

In the case where the composite core particle contains the releasing agent, as for the content of the releasing agent relative to a whole of the composite core particle, for example, the content is in a range of 2 mass % or more and 20 mass % or less, and from a viewpoint of low-temperature fixability and prevention of an offset of the releasing agent (that is, prevention of a part of the releasing agent remaining on the fixing belt due to an excessive amount of the releasing agent), the content is preferably in a range of 5 mass % or more and 15 mass % or less.

In a case where the composite core particle containing the crystalline resin is used as the core particle, low-temperature fixability of the toner is easily obtained as compared with a case where the crystalline resin is not contained.

In the case where the composite core particle contains a crystalline resin, as for the content of the crystalline resin relative to a whole of the composite core particle, for example, the content is in a range of 2 mass % or more and 40 mass % or less, and from a viewpoint of improving low-temperature fixability and chargeability (for example, prevention of charge leakage due to a large amount of a crystalline resin, prevention of an environmental difference between a high-temperature and high-humidity environment and a low-temperature and low-humidity environment, or the like), the content is preferably in a range of 5 mass % or more and 25 mass % or less.

In a case where the composite core particle containing the colorant is used as the core particle, a toner having a color close to a target color is easily obtained as compared with a case where the colorant is not contained.

In the case where the composite core particle contains a colorant, as for the content of the colorant relative to a whole of the composite core particle, for example, the content is in the range of 0.05 mass % or more and 10 mass % or less.

Hereinafter, each component contained in the core particle will be described.

—Large-Diameter Particles—

The large-diameter particle is a particle having a number average particle diameter of 1 μm or more.

The number average particle diameter of the large-diameter particle is, for example, in a range of 1 μm or more and 10 μm or less, and is preferably in a range of 2 μm or more and 9 μm or less, and more preferably in a range of 3 μm or more and 8 μm or less, from a viewpoint of color characteristics (for example, brilliance, phosphorescence, and the like) and fine line reproducibility.

The number average particle diameter of the large-diameter particles is measured using Coulter Multisizer II (manufactured by Beckman Coulter, Inc.) and electrolytic solution is ISOTON-II (manufactured by Beckman Coulter, Inc.).

In the measurement, 0.5 mg or more and 50 mg or less of a measurement sample is added to 2 ml of a 5 mass % aqueous solution of a surfactant (preferably sodium alkylbenzene sulfonate) as a dispersant. The obtained mixture is added to 100 ml or more and 150 ml or less of the electrolytic solution.

The electrolytic solution in which the sample is suspended is subjected to a dispersion treatment for 1 minute with an ultrasonic disperser, and the Coulter Multisizer II is used to measure a particle size distribution of particles having a particle diameter in a range of 2 μm or more and 60 μm or less by using an aperture having an aperture diameter of 100 μm. The number of particles to be sampled is 50,000.

A cumulative distribution of the number is drawn from the small diameter side with respect to the particle size ranges (channels) divided based on the measured particle size distribution, and the particle diameter at which the cumulative percentage is 50% is defined as the number average particle diameter.

The number average particle diameter of the large-diameter particles in the toner may be a value measured by the above method after components other than the large-diameter particles are removed.

Specific examples of the large-diameter particle include a scaly particle such as a brilliant pigment, and a light emitting particle containing a light emitting material.

In a case where the scaly particle is used as the large-diameter particle, the toner particle in which the surface of the core particle is exposed is more easily obtained as compared with the case where a spherical particle is used as the large-diameter particle. However, in the exemplary embodiment, since the coverage of the resin layer on the surface of the core particle is increased, a decrease in fine line reproducibility due to exposure of the surface of the core particle is prevented.

——Scaly Particle——

Examples of the scaly particle include a particle having a ratio (hereinafter, also referred to as an "aspect ratio") of an average length in a long axis direction to an average length in a thickness direction (taken as 1) being 5 or more, and for example, a brilliant pigment is exemplified.

Examples of the brilliant pigment as an example of the scaly particle include: powders of metal such as aluminum (single metal of Al), brass, bronze, nickel, stainless steel, or zinc; mica coated with titanium oxide, yellow iron oxide, or the like; coated flaky inorganic crystal substrates such as barium sulfate, layered silicate, and layered aluminum silicate; single crystal plate-shaped titanium oxide; basic carbonate; bismuth oxychloride; natural guanine; flaky glass powder; and metal-deposited flaky glass powder.

Among the brilliant pigments, metal powder is preferred from the viewpoint of specular reflection intensity, and among these, aluminum powder is more preferred.

The average length of the brilliant pigment in the long axis direction may be 1 μm or more and 30 μm or less, and is preferably 3 μm or more and 20 μm or less, and more preferably 5 μm or more and 15 μm or less.

In a case where the average length of the brilliant pigment in the thickness direction is set as 1, the ratio (aspect ratio) of the average length in the long axis direction to the average length in the thickness direction may be 5 or more and 200 or less, and is preferably 10 or more and 100 or less, and still more preferably 30 or more and 70 or less.

The respective average length and aspect ratio of the brilliant pigment are measured by the following method. Using a scanning electron microscope (S-4800, manufactured by Hitachi High-Tech Corporation), a photograph of a pigment particle is taken at a measurable magnification (300 times to 100,000 times), the length of each particle in the long axis direction and the length of each particle in the thickness direction are measured in a state where the obtained image of the pigment particle is converted into a two-dimensional image, and the average length of the brilliant pigment in the long axis direction and the aspect ratio of the brilliant pigment are determined.

——Light-Emitting Particle——

Examples of the light-emitting particle include a particle that absorb irradiated light and emit light. The light-emitting particle is a particle containing a light-emitting material that absorbs irradiated light and emits light, and may be a particle composed of a light-emitting material or a particle in which a light emitting material is dispersed in a resin or the like.

Examples of the light emitting material include a fluorescent material that emits the energy of the absorbed light as fluorescence, and a phosphorescent material that accumulates the energy of the absorbed light inside and emits the energy as phosphorescence in a dark place.

Examples of the fluorescent material include an inorganic fluorescent material and an organic fluorescent material.

Examples of the inorganic fluorescent material include a material obtained by adding a metal element such as Mn, Zn, Ag, Cu, Sb, or Pb or a rare earth element such as a lanthanoid as an activator to a crystal such as an oxide, sulfide, silicate, phosphate, or tungstate of Ca, Ba, Mg, Zn, or Cd as a main component, and firing the resultant.

Examples of the organic fluorescent material include a fluorescent whitening agent, a derivative such as diaminostilbene, imidazole, coumarin, triazole, carbazole, pyridine, naphthalic acid, or imidazolone, fluorescein, mineral oil, thioflavin, eosin, todamine, anthracene, terphenyl, brilliant sulfotrabin, basic yellow, eolene, and an organic pigment dye (trade name: Lumogen color (BASF), FZ6014 (Sinroich)).

Examples of a phosphorescent material include inorganic pigments such as zinc sulfide (ZnS), zinc silicate ($Zn_2SiO_4$), zinc cadmium sulfide [(Zn,Cd)S], calcium sulfide (CaS), strontium sulfide (SrS), calcium tungstate ($CaWO_4$), strontium aluminate ($SrAl_2O_4$), phosphorescent zinc sulfide, and zinc hexasulfide; and organic pigments such as Lumogen L yellow, Lumogen yellow orange and Lumogen L red orange. A rare earth element, particularly Eu or Dy, may be added to the inorganic pigment.

The fluorescent material and the phosphorescent material may be subjected to a surface treatment with a surface treatment agent for the purpose of improving dispersibility in the resin.

As the surface treatment agent, common surface treatment agents such as various coupling agents and dispersibility-improving agents are used. Specific examples of the surface treatment agent include a silane coupling agent, a titanate coupling agent, an aluminate coupling agent, and a zirconate coupling agent.

Examples of the resin in which the light-emitting material is dispersed include polyvinyl-based resins such as polyolefin, polystyrene, acrylic resin, polyacrylonitrile, polyvinyl acetate, polyvinyl alcohol, vinyl chloride, and polyvinyl butyral; vinyl chloride-vinyl acetate copolymers; styrene-acrylic acid copolymers; straight silicone resins composed of organosiloxane bonds and modifications thereof; fluorine resins such as polytetrafluoroethylene, polyvinyl fluoride, and polyvinylidene fluoride; polyesters, polyurethanes, and polycarbonates; amino resins; and epoxy resins.

These resins may be used alone or as a mixture of plural resins. These resins may be crosslinked.

Examples of the resin in which the light emitting material is dispersed include the amorphous resin described below that is used in the toner of the exemplary embodiment.

In a case where the light-emitting particle is a particle in which a light emitting material is dispersed in a resin, the content of the light emitting material relative to a whole of the light-emitting particle is, for example, in a range of 5 mass % or more and 40 mass % or less, and may be in a range of 10 mass % or more and 20 mass % or less.

The light-emitting particle may be a particle in which a fluorescent material is dispersed in a resin, a particle in which a phosphorescent material is dispersed in a resin, or a particle in which both a fluorescent material and a phosphorescent material are dispersed in a resin.

—Amorphous Resin—

Examples of the amorphous resin include vinyl-based resins composed of a homopolymer of monomers such as styrenes (such as styrene, parachlorostyrene, and α-methylstyrene), (meth)acrylic acid esters (such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (such as acrylonitrile and methacrylonitrile), vinyl ethers (such as vinyl methyl ether and vinyl isobutyl ether), vinyl ketones (such as vinyl methyl ketone, vinyl ethyl ketone, and vinyl isopropenyl ketone), or olefins (such as ethylene, propylene, and butadiene), or a copolymer obtained by combining two or more kinds of these monomers.

Examples of the amorphous resin include non-vinyl-based resins such as an epoxy resin, a polyester resin, a polyurethane resin, a polyamide resin, a cellulose resin, a polyether resin, and a modified rosin, a mixture of the non-vinyl-based resin and the vinyl-based resin, and a graft polymer obtained by polymerizing a vinyl-based monomer in the presence of these.

These amorphous resins may be used alone or in combination of two or more thereof.

"Crystalline" of a resin means that the resin has a clear endothermic peak rather than a stepwise change in an endothermic amount in differential scanning calorimetry (DSC), and specifically means that a half width of the endothermic peak when measured at a temperature rising rate of 10 (° C./min) is within 10° C.

On the other hand, "amorphous" of a resin means that a half width exceeds 10° C., a stepwise change in the endothermic amount is exhibited, or a clear endothermic peak is not observed.

The amorphous resin may be a polyester resin.

Examples of the amorphous polyester resin include a condensed polymer of a polycarboxylic acid and a polyhydric alcohol. As the amorphous polyester resin, a commercially available product or a synthesized product may be used.

Examples of the polycarboxylic acid include aliphatic dicarboxylic acids (such as oxalic acid, malonic acid, maleic acid, fumaric acid, citraconic acid, itaconic acid, glutaconic acid, succinic acid, alkenyl succinic acid, adipic acid, and sebacic acid), alicyclic dicarboxylic acids (such as cyclohexanedicarboxylic acid), aromatic dicarboxylic acids (such as terephthalic acid, isophthalic acid, phthalic acid, and naphthalenedicarboxylic acid), anhydrides thereof, and lower alkyl esters (for example, having 1 to 5 carbon atoms) thereof. Among these, the polycarboxylic acid is preferably, for example, an aromatic dicarboxylic acid. As the polycarboxylic acid, a tricarboxylic acid or higher carboxylic acid having a cross-linked structure or a branched structure may be used in combination with a dicarboxylic acid.

Examples of the tricarboxylic acid or higher carboxylic acid include trimellitic acid, pyromellitic acid, and an anhydride thereof or a lower alkyl ester (such as having 1 to 5 carbon atoms) thereof.

The polycarboxylic acid may be used alone or in combination of two or more kinds thereof.

Examples of the polyhydric alcohol include aliphatic diols (such as ethylene glycol, diethylene glycol, triethylene glycol, propylene glycol, butanediol, hexanediol, and neopentyl glycol), alicyclic diols (such as cyclohexanediol, cyclohexanedimethanol, and hydrogenated bisphenol A), and aromatic diols (such as an ethylene oxide adduct of bisphenol A and a propylene oxide adduct of bisphenol A). Among these, the polyhydric alcohol is preferably, for example, an aromatic diol and an alicyclic diol, and more preferably an aromatic diol. As the polyhydric alcohol, a trihydric alcohol or higher polyhydric alcohol having a cross-linked structure or a branched structure may be used in combination with a diol.

Examples of the trihydric alcohol or higher polyhydric alcohol include glycerin, trimethylolpropane, and pentaerythritol.

The polyhydric alcohol may be used alone or in combination of two or more kinds thereof.

A glass transition temperature (Tg) of the amorphous polyester resin may be 50° C. or higher and 80° C. or lower, and is preferably 50° C. or higher and 65° C. or lower.

The glass transition temperature is determined from a DSC curve obtained by differential scanning calorimetry (DSC), and is more specifically determined by the "extrapolated glass transition onset temperature" described in a method for obtaining the glass transition temperature in "Method for measuring glass transition temperature of plastics" in JIS K 7121-1987.

A weight average molecular weight (Mw) of the amorphous polyester resin may be 5,000 or more and 1,000,000 or less, and is preferably 7,000 or more and 500,000 or less.

A number average molecular weight (Mn) of the amorphous polyester resin may be 2,000 or more and 100,000 or less.

A molecular weight distribution Mw/Mn of the amorphous polyester resin may be 1.5 or more and 100 or less, and is preferably 2 or more and 60 or less.

The weight average molecular weight and the number average molecular weight are measured by gel permeation chromatography (GPC). The molecular weight is measured by GPC by using a GPC HLC-8120GPC manufactured by Tosoh Corporation as a measurement apparatus, a column TSKgel Super HM-M (15 cm) manufactured by Tosoh Corporation, and using a THF solvent. The weight average molecular weight and the number average molecular weight are calculated based on the measurement results using a molecular weight calibration curve prepared using a monodispersed polystyrene standard sample.

The amorphous polyester resin is obtained by a common production method. Specifically, for example, the amorphous polyester resin is obtained by a method in which a polymerization temperature is set to 180° C. or higher and 230° C. or lower, the pressure inside a reaction system is reduced as necessary, and reaction is performed while removing water or alcohols generated during condensation.

In a case where raw material monomers are insoluble or incompatible at a reaction temperature, a high boiling point solvent may be added as a dissolution assisting agent for dissolution. In this case, a polycondensation reaction is performed while distilling off the dissolution assisting agent. In a case where there is a poorly compatible monomer, the poorly compatible monomer may be firstly condensed with an acid or alcohol to be polycondensed with the poorly compatible monomer, and then the obtained product is polycondensed with the main component.

—Releasing Agent—

Examples of the releasing agent include hydrocarbon wax, natural wax such as carnauba wax, rice wax, and candelilla wax, synthetic wax or mineral or petroleum wax such as montan wax, and ester wax such as fatty acid ester and montanic acid ester. The releasing agent is not limited thereto.

The melting temperature of the releasing agent may be 50° C. or higher and 110° C. or lower, and is preferably 60° C. or higher and 100° C. or lower.

The melting temperature is determined based on the DSC curve obtained by differential scanning calorimetry (DSC) in accordance with the "melting peak temperature" described in a method for obtaining the melting temperature in "Method for measuring transition temperature of plastics" in JIS K 7121-1987.

—Crystalline Resin—

Examples of the crystalline resin include a crystalline polyester resin.

Examples of the crystalline polyester resin include a polycondensate of a polycarboxylic acid and a polyhydric alcohol. As the crystalline polyester resin, a commercially available product or a synthesized product may be used.

Here, in order to easily form a crystal structure, the crystalline polyester resin may be a polycondensate using a polymerizable monomer having a linear aliphatic group rather than a polymerizable monomer having an aromatic ring.

Examples of the polycarboxylic acid include aliphatic dicarboxylic acids (such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (e.g. dibasic acids such as phthalic acid, isophthalic acid, terephthalic acid, and naphthalene-2,6-dicarboxylic acid), anhydrides thereof, or lower alkyl esters (for example, having 1 to 5 carbon atoms) thereof.

As the polycarboxylic acid, a tricarboxylic acid or higher carboxylic acid having a cross-linked structure or a branched structure may be used in combination with a dicarboxylic acid. Examples of the tricarboxylic acid include aromatic carboxylic acids (such as 1,2,3-benzenetricarboxylic acid, 1,2,4-benzenetricarboxylic acid, and 1,2,4-naphthalenetricarboxylic acid), anhydrides thereof, and lower alkyl esters (for example, having 1 to 5 carbon atoms) thereof.

As the polycarboxylic acid, a dicarboxylic acid having a sulfonic acid group and a dicarboxylic acid having an ethylenic double bond may be used in combination with these dicarboxylic acids.

The polycarboxylic acid may be used alone or in combination of two or more kinds thereof.

Examples of the polyhydric alcohol include aliphatic diols (such as linear aliphatic diols having 7 to 20 carbon atoms in the main chain part). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecandiol, 1,14-tetradecanediol, 1,18-octadecanediol, and 1,20-eicosanediol. Among these, the aliphatic diol is preferably 1,8-octanediol, 1,9-nonanediol, or 1,10-decanediol. As the polyhydric alcohol, a trihydric or higher alcohol having a crosslinked structure or a branched structure may be used in combination with the diol.

Examples of the trihydric or higher alcohol include glycerin, trimethylolethane, trimethylolpropane, and pentaerythritol.

The polyhydric alcohol may be used alone or in combination of two or more kinds thereof.

Here, the polyhydric alcohol preferably may have an aliphatic diol content of 80 mol % or more, and preferably 90 mol % or more.

A melting temperature of the crystalline polyester resin may be 50° C. or higher and 100° C. or lower, and is preferably 55° C. or higher and 90° C. or lower, and more preferably 60° C. or higher and 85° C. or lower.

The melting temperature is obtained from the DSC curve obtained by differential scanning calorimetry (DSC) in accordance with the "melting peak temperature" described in a method for obtaining the melting temperature in "Method for measuring transition temperature of plastics" in JIS K 7121-1987.

A weight average molecular weight (Mw) of the crystalline polyester resin may be 6,000 or more and 35,000 or less.

The crystalline polyester resin is obtained by, for example, a common production method like the case of the amorphous polyester.

—Colorant—

Examples of the colorant include various pigments such as carbon black, Chrome Yellow, Hansa Yellow, Benzidine Yellow, Thlene Yellow, Quinoline Yellow, Pigment Yellow, Permanent Orange GTR, Pyrazolone Orange, Vulkan Orange, Watchung Red, Permanent Red, Brilliant Carmine 3B, Brilliant Carmine 6B, DuPont Oil Red, Pyrazolone Red, Lithol Red, Rhodamine B Lake, Lake Red C, Pigment Red, Rose Bengal, Aniline Blue, Ultramarine Blue, Calco Oil Blue, Methylene Blue Chloride, Phthalocyanine Blue, Pigment Blue, Phthalocyanine Green, and Malachite Green Oxalate; and acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

The colorant may be used alone or in combination of two or more kinds thereof.

As the colorant, a surface-treated colorant may be used as necessary, or the colorant may be used in combination with a dispersant. Plural kinds of colorants may be used in combination.

—Other Additives—

Examples of the other additives include common additives such as a magnetic body, an electrostatic charge control agent, and an inorganic powder. These additives are contained in the composite core particles as internal additives.

(Shell Layer)

The shell layer includes at least two resin layers in which the resin layer consisting of the amorphous resin is included as the outermost layer of the at least two resin layers.

Here, the "outermost layer" is a layer constituting the surface of the toner particle. The "innermost layer" is a layer in contact with the core particle, and the "intermediate layer" is a layer other than the outermost layer and the innermost layer.

The number of the resin layers constituting the shell layer may be at least two, and for example, a range of 2 to 20 may be exemplified, and from the viewpoint of fine line reproducibility and manufacturability, the number is preferably 3 or more and 15 or less, and more preferably 3 or more and 10 or less.

In a case where the number of the resin layers constituting the shell layer is 2, the shell layer is constituted by two resin layers provided in the order of the innermost layer and the outermost layer from the core particle side. In a case where the number of the resin layers constituting the shell layer is 3, the shell layer is constituted by three resin layers provided in the order of the innermost layer, an intermediate layer, and the outermost layer from the core particle side. In a case where the number of the resin layers constituting the shell layer is 4, the shell layer is constituted by four resin layers provided in the order of the innermost layer, a first intermediate layer, a second intermediate layer, and the outermost layer from the core particle side.

Of the at least two resin layers, the outermost layer is a resin layer consisting of an amorphous resin. On the other hand, the innermost layer and the intermediate layer(s) contain at least an amorphous resin, and may contain a releasing agent, a crystalline resin, a colorant, other additives, or the like as necessary.

Specific examples of the amorphous resin, the releasing agent, the crystalline resin, and the colorant contained in the shell layer are same as the specific examples of the amorphous resin, the releasing agent, the crystalline resin, and the colorant described as the components contained in the composite core particle.

Here, the resin layer consisting of the amorphous resin is a resin layer to which a releasing agent, a crystalline resin, and a colorant, which are toner constituent materials other than the amorphous resin, are not intentionally added, and may contain components (for example, an aggregating agent, a dispersion medium, and the like) inevitably mixed during the production process.

In a case where the core particle contains a component other than the large-diameter particle, the kind of each component contained in the shell layer may be the same as or different from the kind of each component contained in the core particle. Specifically, for example, in a case where the core particle contains an amorphous polyester resin, the amorphous resin contained in the shell layer may be the same resin as the amorphous polyester resin contained in the core particle, may be a different amorphous polyester resin, or may be an amorphous resin other than the polyester resin.

The resin layers constituting the shell layers may have a composition same as or different from each other. Among the resin layers constituting the shell layer, resin layers adjacent to each other may have different compositions.

Here, examples of the two resin layers having different compositions include two resin layers having different kinds of components contained therein, two resin layers having the same kind of components contained therein but having different ratios, and two resin layers in which a part of components contained in one resin layer is not contained in the other resin layer.

The shell layer may include a resin layer containing a releasing agent from a viewpoint of preventing gloss unevenness of a fixed image. In a case where the number of the resin layers constituting the shell layer is 2, the innermost layer preferably contains a releasing agent from the viewpoint of preventing gloss unevenness of a fixed image. In a case where the number of the resin layers constituting the shell layer is 3 or more, at least one resin layer selected from the innermost layer and the intermediate layer preferably contains a releasing agent from the viewpoint of preventing gloss unevenness of a fixed image.

On the other hand, in a case where the core particle contain a releasing agent, it is preferable that the innermost layer of the shell layer does not contain the releasing agent from the viewpoint of preventing deterioration of the particle size distribution caused by aggregation due to hydrophobic interaction in the production process.

That is, from a viewpoint of achieving both prevention of gloss unevenness of a fixed image and prevention of deterioration of particle size distribution, it is preferable that the shell layer includes at least three resin layers, the innermost layer does not include a releasing agent, and the intermediate layer includes a resin layer including a releasing agent.

From the viewpoint of fine line reproducibility, the shell layer is preferably composed of at least three resin layers in which the innermost layer consists of an amorphous resin, and at least one of the resin layer among the intermediate layers contains an amorphous resin and at least one selected from the group consisting of releasing agents, crystalline resins, and colorants. In the case where the intermediate layer includes a resin layer containing at least one selected from the group consisting of releasing agents, crystalline resins, and colorants, electrostatic repulsion is prevented and a coverage of the surface of the core particle with the shell layer is likely to increase.

The outermost layer of the shell layer may contain an amorphous resin having a glass transition temperature higher than that of the amorphous resin contained in the other resin layers, from a viewpoint of achieving both improvement in thermal characteristics of the toner and low-temperature fixability.

A difference Tg1−Tg2 between the glass transition temperature Tg1 of the amorphous resin contained in the outermost layer of the shell layer and the glass transition temperature Tg2 of the amorphous resin contained in the other resin layer is, for example, in a range of 0° C. or more 15° C. or less, and from a viewpoint of achieving both improvement in thermal characteristics of the toner and low-temperature fixability, the difference is preferably in a range of 0° C. or more and 12° C. or less, and more preferably in a range of 0° C. or more and 10° C. or less.

The Tg1 is, for example, in a range of 45° C. or more and 65° C. or less, and from the viewpoint of achieving both improvement in thermal characteristics of the toner and low-temperature fixability, the Tg1 is preferably in a range of 50° C. or more and 63° C. or less, and more preferably in a range of 55° C. or more and 61° C. or less.

The mass of the entire shell layer is, for example, in a range of 100 parts by mass or more and 450 parts by mass or less, preferably in a range of 150 parts by mass or more and 400 parts by mass or less, and more preferably in a range of 200 parts by mass or more and 350 parts by mass or less, relative to 100 parts by mass of the core particles. In the case where the mass of the entire shell layer is in the above range, the coverage of the shell layer for the surface of the core particle is high, and the fine line reproducibility is high, as compared with a case where the mass is less than the above range. In the case where the mass of the entire shell layers is within the above range, there is an advantage that a function of the large-diameter particles is more likely to be exhibited as compared with the case where the mass is more than the above range. In the exemplary embodiment, since the core particle contains the large-diameter particle, the mass of the entire shell layer is larger than that of the shell layer that covers the core particles that do not contain the large-diameter particles.

A thickness of the entire shell layer is, for example, in a range of 0.5 μm or more and 4 μm or less, preferably in a range of 0.8 μm or more and 3 μm or less, and more preferably in a range of 1.2 μm or more and 2.5 μm or less. In the case where the thickness of the entire shell layer is within the above range, fine line reproducibility is improved as compared with a case where the thickness is smaller than the above range. In the case where the thickness of the entire shell layers is within the above range, there is an advantage that a function of the large-diameter particles is more likely to be exhibited as compared with the case where the thickness is larger than the above range.

The thickness of the entire shell layer is determined by cross section observation of the toner by TEM and calculating a distance from the surface layer of the toner to the pigment. For example, in the case of a brilliant toner using a brilliant pigment as the large-diameter particle, the thickness of the entire shell layer is measured as follows.

Specifically, brilliant toners are embedded using a bisphenol A type liquid epoxy resin and a curing agent, and then a sample for cutting is prepared. Next, the sample for cutting is cut at −100° C. using a cutting machine that uses a diamond knife (for example, LEICA Ultramicrotome (manufactured by Hitachi Technologies Corporation)) to prepare a sample for observation. A cross section of the observation sample is observed with a transmission electron microscope (TEM) at a magnification of about 5,000 times. For the observed 1000 brilliant toner particles, a distance between the toner surface layer and the large-diameter particles in the cross section of the brilliant toner particles is calculated using image analysis software.

(Characteristics of Toner Particles)

A volume average particle diameter D50v of the toner particle may be 2 μm or more and 12 μm or less, and is preferably 4 μm or more and 11 μm or less.

Various average particle diameter and various particle size distribution indices of the toner particles are measured by using a Coulter Multisizer II (manufactured by Beckman Coulter, Inc.) and ISOTON-II (manufactured by Beckman Coulter, Inc.) as an electrolytic solution.

In the measurement, 0.5 mg or more and 50 mg or less of a measurement sample is added to 2 ml of a 5 mass % aqueous solution of a surfactant (preferably sodium alkylbenzene sulfonate) as a dispersant. The obtained mixture is added to 100 ml or more and 150 ml or less of the electrolytic solution.

The electrolytic solution in which the sample is suspended is dispersed for 1 minute with an ultrasonic disperser, and the Coulter Multisizer II is used to measure the particle size distribution of particles having a particle diameter in a range of 2 μm or more and 60 μm or less by using an aperture having an aperture diameter of 100 μm. The number of the particles to be sampled is 50,000.

A cumulative distribution of the volume and a cumulative distribution of the number are respectively drawn from a small diameter side with respect to the particle size range (channel) divided based on the measured particle size distribution, and particle diameters at which a cumulative percentage is 16% are respectively defined as a volume particle diameter D16v and a number particle diameter D16p, particle diameters at which the cumulative percentage is 50% are respectively defined as a volume average particle diameter D50v and a cumulative number average particle diameter D50p, and particle diameters at which the cumulative percentage is 84% are respectively defined as a volume particle diameter D84v and a number particle diameter D84p.

Using these, the volume particle size distribution index (GSDv) is calculated as $(D84v/D16v)^{1/2}$, and the number particle size distribution index (GSDp) is calculated as $(D84p/D16p)^{1/2}$.

<External Additive>

Examples of the external additive include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, CaO $SiO_2$, $K_2O$ $(TiO_2)n$, $Al_2O_32SiO_2$, $CaCO_3$, $MgCO_3$, $BaSO_4$, and $MgSO_4$.

The surfaces of the inorganic particles as the external additive may be subjected to a hydrophobic treatment. The hydrophobic treatment is performed by, for example, immersing the inorganic particles in a hydrophobic treatment agent. The hydrophobic treatment agent is not particularly limited, and examples thereof include a silane coupling agent, a silicone oil, a titanate coupling agent, and an aluminum coupling agent. The hydrophobic treatment agent may be used alone or in combination of two or more thereof.

An amount of the hydrophobic treatment agent is generally, for example, 1 part by mass or more and 10 parts by mass or less relative to 100 parts by mass of the inorganic particles.

Examples of the external additive also include resin particles (resin particles of polystyrene, polymethylmethacrylate (PMMA), melamine resin or the like), and cleaning activators (for example, metal salts of higher fatty acids represented by zinc stearate, and particles of a fluoropolymer).

The amount of the external additive externally added may be, for example, 0.01 mass % or more and 5 mass % or less, and is preferably 0.01 mass % or more and 2.0 mass % or less, relative to the toner particles.

<Resin Single Particles>

The toner according to the exemplary embodiment may not contain a resin single particle, or the content of the resin single particle may be equal to or less than 80% by number of a total of the toner. The resin single particle is a particle containing an amorphous resin and not containing large-diameter particles. The resin single particle is formed by aggregation of the amorphous resin particles in the step of covering the surfaces of the core particle with the resin layer.

In the case where the content of the resin single particles is in the above range, occurrence of a region where the function of the large-diameter particle is not partially exhibited in the fixed image due to the presence of the resin single particle is prevented and decrease in the granularity is prevented, and a fixed image having good granularity is obtained, as compared with a case where the content is more than the above range. In the case where the content of the resin single particles is in the above range, the toner particle having a high coverage ratio of the resin layer for the surface of the core particle is easily obtained, and the fine line reproducibility is increased, as compared with a case where the content of the resin single particle is more than the above range.

The content of the resin single particle is more preferably 50% by number or less, even more preferably 40% by number or less, relative to the total of the toner, and the case where the resin single particle is not included is further preferred.

The content of the resin single particle is measured as follows. Specifically, first, the toner particles are embedded using a bisphenol A type liquid epoxy resin and a curing agent, and then a sample for cutting is prepared. Next, the sample for cutting is cut at −100° C. using a cutting machine that uses a diamond knife (for example, LEICA Ultramicrotome (manufactured by Hitachi Technologies Corporation)) to prepare a sample for observation. The observation sample is observed with a TEM at a magnification of about 5,000 times.

The large-diameter particle is distinguished from the binder resin based on a difference in density of the observed image due to the difference in the composition between the large-diameter particle and the binder resin.

In this manner, the cross section of 5,000 toner particles is observed, and the ratio of the number of toner particles not containing large-diameter particles is calculated.

<Method for Producing Toner>

Hereinafter, the method for producing the toner according to the exemplary embodiment will be described in detail.

The toner according to the exemplary embodiment is obtained by preparing a toner particle and then externally adding an external additive to the toner particle.

The toner particle is obtained by coating the core particles with the shell layer.

Specifically, the toner particle is obtained by the steps of: a core particle dispersion liquid preparing step of preparing a core particle dispersion liquid in which a core particle containing a large-diameter particle having a number average particle diameter of 1 μm or more is dispersed; a resin particle layer forming step of performing an operation of adding an amorphous resin particle to the core particle dispersion liquid and aggregating the core particle and the amorphous resin particle such that the amorphous resin particle adheres to the core particle, thereby forming a resin particle layer on a surface of the core particle; a repeating step of repeating the operation at least one time, in which only the amorphous resin particle is added as a particle added in the last operation, thereby forming an aggregated particle including at least two resin particle layers on the surface of the core particle, an outermost layer of the at least two resin particle layers consisting of the amorphous resin particles; and a fusion and coalescence step of heating an aggregated particle dispersion liquid in which the aggregated particle is dispersed to fuse and coalesce the aggregated particle, thereby forming a toner particle.

In a case where the toner particle is obtained by the above-described method, a toner capable of giving an image having high fine line reproducibility is produced as compared with a case where the toner particle is obtained by performing the formation of the resin particle layer only once without performing the above-described repeating step.

Specifically, as described above, in a case where the core particle has a large-diameter particle, a large amount of resin is required to be attached to the core particle, and thus the concentration of the amorphous resin particle in the dispersion liquid of the core particle is increased, and the amorphous resin particles are likely to aggregate with each other. Then, as described above, the resin single particle is easily formed, and when a large amount of the toner particle in which the surface of the core particle is exposed is formed, the fine line reproducibility is likely to decrease, and the graininess is likely to deteriorate due to the formation of a large amount of the resin single particles.

On the other hand, in the above production method, the shell layer is formed through the resin particle layer forming step and the repeating step. That is, since the surface of the core particle is coated with the shell layer through at least two steps, the concentration of the amorphous resin particle in the dispersion liquid is lower than that in the case where the resin layer having the same mass is formed on the surface of the core particle in one step. Therefore, it is considered that the adhesion of the amorphous resin particle to the surface of the core particle is more likely to occur instead of the aggregation of the amorphous resin particles, and the formation of the resin single particle is prevented, the coverage of the resin layer on the surface of the core particle is increased, and the decrease in fine line reproducibility and deterioration of graininess are prevented.

In the repeating step, since the particle added in the last operation is only the amorphous resin particle, the outermost layer of the shell layer is a resin layer consisting of an amorphous resin without containing a releasing agent and the like, and it is considered that a toner by which a decrease in fine line reproducibility caused by aggregation of the toner particles is prevented is obtained.

In the resin particle layer forming step and the repeating step, it is preferred that the particle added in the resin particle layer forming step is only amorphous resin particle, and the operation is further repeated at least two time in the repeating step, and the particle added in at least one time or more of the operation excluding the last operation includes the amorphous resin particle and at least one selected from the group consisting of releasing agent particles, crystalline resin particles, and colorant particles, and the aggregated particle including at least three resin particle layers is formed on the surface of the core particle, and an innermost layer of the at least three resin particle layers consists of the amorphous resin particle, and an intermediate layer of the at least three resin particle layers includes the amorphous resin particle and at least one selected from the group consisting of the releasing agent particles, the crystalline resin particles, and the colorant particles.

By the resin particle layer forming step and the repeating step, the shell layer includes at least three resin layers each containing an amorphous resin, and a toner in which the innermost layer of the at least three resin layers consists of an amorphous resin, and an intermediate layer of the at least three resin layers includes a resin layer containing an amorphous resin and at least one selected from the group consisting of releasing agents, crystalline resins, and colorants is obtained.

The addition of the amorphous resin particle may be performed by adding an amorphous resin particle dispersion liquid in which the amorphous resin particles are dispersed. The details of the amorphous resin particle dispersion liquid are same as the details of the amorphous resin particle dispersion liquid used in the production of the composite core particle described below.

Hereinafter, each step will be described.

(Core Particle Dispersion Liquid Preparation Step)

—Preparation of Single Core Particle Dispersion Liquid—

In a case where the core particle is a single core particle, the single core particle dispersion liquid is prepared, for example, by dispersing the single core particle in a dispersion medium using a surfactant. The dispersion medium, the surfactant, the dispersion method, and the content of the core particle used in the preparation of the single core particle dispersion liquid are same as those of the dispersion medium, the surfactant, the dispersion method, and the content of the amorphous resin particle used in the preparation of the amorphous resin particle dispersion liquid described below.

—Preparation of Composite Core Particle Dispersion Liquid—

In a case where the core particle is a composite core particle, the composite core particle may be manufactured by either a dry production method (such as a kneading pulverization method) or a wet production method (such as an aggregation and coalescence method, a suspension polymerization method, and a dissolution suspension method). Production method of the composite core particle is not particularly limited, and common production methods are used.

Among these, it is preferable to obtain the composite core particle by the aggregation and coalescence method.

Specifically, for example, in a case where the composite core particle is produced by the aggregation and coalescence method, the composite core particle dispersion liquid is obtained through a step of preparing an amorphous resin particle dispersion liquid in which amorphous resin particle is dispersed (amorphous resin particle dispersion liquid preparation step), a step of aggregating the amorphous resin particles (and other particles if necessary) in the amorphous resin particle dispersion liquid (in a dispersion liquid after mixing with another particle dispersion liquid if necessary) to form a composite core aggregated particle (aggregation step), thereby producing the composite core particle.

The composite core particle may be obtained through a step of heating the composite core aggregated particle dispersion liquid in which the composite core aggregated particle is dispersed to fuse and coalesce the composite core aggregated particle, in addition to the amorphous resin particle dispersion liquid preparation step and the aggregation step. The details of the step of fusing and coalescing the composite core aggregated particle are same as the details of the fusion and coalescence step described below.

As the composite core particle dispersion liquid, a dispersion liquid of the composite core particle obtained in the process of producing a composite core particle may be used as it is, or a composite core particle dispersion liquid obtained by obtaining a composite core particle in a dry state and then dispersing the composite core particles in a dispersion medium may be used.

Details of each step will be described below.

In the following description, although a method for obtaining a composite core particle containing a colorant and a releasing agent will be described, the colorant and the releasing agent are optional elements. Of course, other additives other than the colorant and the releasing agent, the crystalline resin or the like may be used.

—Amorphous Resin Particle Dispersion Liquid Preparation Step—

First, along with the amorphous resin particle dispersion liquid in which the amorphous resin particle is dispersed, for example, a colorant particle dispersion liquid in which the colorant particle is dispersed and a releasing agent particle dispersion liquid in which the releasing agent particle is dispersed are prepared.

Here, the amorphous resin particle dispersion liquid is prepared, for example, by dispersing the amorphous resin particle in a dispersion medium with a surfactant.

Examples of the dispersion medium used for preparing the amorphous resin particle dispersion liquid include an aqueous medium.

Examples of the aqueous medium include water such as distilled water and ion exchange water, and alcohols. These may be used alone or in combination of two or more kinds thereof.

Examples of the surfactant include anionic surfactants such as a sulfate-based surfactant, sulfonate-based surfactant, phosphate-based surfactant, and soap-based surfactant, cationic surfactants such as an amine salt-based surfactant and quaternary ammonium salt-based surfactant, and non-ionic surfactants such as a polyethylene glycol-based surfactant, alkylphenol ethylene oxide adduct-based surfactant, and polyhydric alcohol-based surfactant. Among these, the anionic surfactant and the cationic surfactant are particularly mentioned. The non-ionic surfactant may be used in combination with the anionic surfactant or the cationic surfactant.

The surfactant may be used alone or in combination of two or more kinds thereof.

Examples of a method for dispersing the amorphous resin particle in the dispersion medium in the amorphous resin particle dispersion liquid include general dispersion methods such as a rotary shear homogenizer, a ball mill having a medium, a sand mill, a dyno mill and the like. Depending on the kind of the amorphous resin particles, the amorphous resin particle may be dispersed in the amorphous resin particle dispersion liquid using a phase inversion emulsification method.

The phase inversion emulsification method is a method of dispersing a resin in an aqueous medium in a form of particles by dissolving a resin to be dispersed in a hydrophobic organic solvent in which the resin is soluble, adding a base to an organic continuous phase (0 phase) for neutralization, and then adding an aqueous medium (W phase) to convert the resin from W/O to O/W (so-called phase inversion) to form a discontinuous phase.

A volume average particle diameter of the amorphous resin particle dispersed in the amorphous resin particle dispersion liquid may be, for example, 0.01 μm or more and 1 μm or less, and is preferably 0.08 μm or more and 0.8 μm or less, and more preferably 0.1 μm or more and 0.6 μm or less.

The volume average particle diameter D50v of the amorphous resin particles is calculated by the volume-based particle size distribution obtained by measurement with a laser diffraction-type particle size distribution measurement device (for example, LA-700 manufactured by HORIBA, Ltd.). A divided particle size range is set and the volume-based particle size distribution is obtained. Then, a cumulative distribution is drawn from a small particle diameter size and a particle diameter corresponding to the cumulative percentage of 50% relative to all the particles is the volume average particle diameter D50v. The volume average particle diameter of the particles in another dispersion liquid is measured in the same manner.

A content of the amorphous resin particle contained in the amorphous resin particle dispersion liquid may be 5 mass % or more and 50 mass % or less, and is preferably 10 mass % or more and 40 mass % or less.

Similar to the amorphous resin particle dispersion liquid, for example, the colorant particle dispersion liquid and the releasing agent particle dispersion liquid are also prepared. That is, the volume average particle diameter of particles, the dispersion medium, the dispersion method, and the content of the particles in the amorphous resin particle dispersion liquid are the same for the colorant particles dispersed in the colorant particle dispersion liquid and the releasing agent particles dispersed in the releasing agent particle dispersion liquid.

——Aggregating Step——

Next, the amorphous resin particle dispersion liquid, the colorant particle dispersion liquid, and the releasing agent particle dispersion liquid are mixed.

Then, the composite core aggregated particles containing the amorphous resin particles, the colorant particles, and the releasing agent particles, each having a diameter close to the diameter of the target toner particles are formed by hetero-aggregating the amorphous resin particles, the colorant particles, and the releasing agent particles in the mixed dispersion liquid.

Specifically, for example, an aggregating agent is added to the mixed dispersion liquid, a pH of the mixed dispersion liquid is adjusted to acidic (for example, a pH of 2 or more and 5 or less), and a dispersion stabilizer is added if necessary. Then, the amorphous resin particles are heated to a temperature of a glass transition temperature (specifically, for example, the temperature being equal to or higher than "the glass transition temperature of amorphous resin particles minus 30° C." and the temperature being equal to or lower than "the glass transition temperature minus 10° C."), to aggregate the particles dispersed in the mixed dispersion liquid, and thus the composite core aggregated particles are formed.

In the aggregating, for example, the aggregating agent may be added at room temperature (for example, 25° C.) while stirring the mixed dispersion liquid with a rotary shear homogenizer, the pH of the mixed dispersion may be adjusted to be acidic (for example, a pH 2 or more and 5 or less), the dispersion stabilizer may be added as necessary, and then heating may be performed.

Examples of the aggregating agent include a surfactant having a polarity opposite to that of the surfactant used as a dispersant added to the mixed dispersion liquid, an inorganic metal salt, and a divalent or higher metal complex. In particular, in a case where the metal complex is used as the aggregating agent, an amount of the surfactant used is reduced and chargeability is improved.

If necessary, an additive that forms a complex or a similar bond with the metal ion of the aggregating agent may be used. A chelating agent may be used as the additive.

Examples of the inorganic metal salt include: metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide. A water-soluble chelating agent may be used as the chelating agent.

Examples of the chelating agent include oxycarboxylic acids such as tartaric acid, citric acid and gluconic acid, iminodiacetic acid (IDA), nitrilotriacetic acid (NTA), and ethylenediaminetetraacetic acid (EDTA). An addition amount of the chelating agent may be 0.01 part by mass or more and 5.0 parts by mass or less, and is preferably 0.1 part by mass or more and less than 3.0 parts by mass, relative to 100 parts by mass of the resin particles.

The composite core particles are obtained by the above steps.

(Resin Particle Layer Forming Step and Repeating Step)

In the resin particle layer forming step, the resin particle layer is formed on the surface of the core particle by an operation of adding the amorphous resin particle to the core particle dispersion liquid and aggregating the core particle and the amorphous resin particle such that the amorphous resin particle adheres to the core particle.

In the repeating step, an operation of adding the amorphous resin particle to the core particle dispersion liquid and aggregating the core particle and the amorphous resin particle such that the amorphous resin particle adheres to the core particle is further repeated at least one time. Then, the particle added to the core particle dispersion liquid in the last operation is only the amorphous resin, and then, the aggregated particle is obtained. The aggregated particle has at least two resin particle layers at least on the surface of the core particle, and the outermost layer of the at least two resin particle layers is a resin particle layer consisting of the amorphous resin particle.

The addition of the amorphous resin particle in each operation in the resin particle layer forming step and in the repeating step may be, for example, performed by adding an amorphous resin particle dispersion liquid in which the amorphous resin particle is dispersed. The details of the amorphous resin particle dispersion liquid are same as the details of the amorphous resin particle dispersion liquid used in the production of the composite core particle described above.

In a case where the above operation is an operation for forming a resin particle layer consisting of the amorphous resin particle, that is, in a case where a resin layer consisting of the amorphous resin is formed among the resin layers of the shell layer of the toner particle, for example, only the amorphous resin particle dispersion liquid is used as the dispersion liquid to be added.

In a case where the above operation is an operation for forming a resin particle layer containing the releasing agent particle, that is, in a case where a resin layer containing the releasing agent is formed among the resin layers of the shell layer of the toner particle, for example, in addition to the amorphous resin particle dispersion, a releasing agent particle dispersion liquid is added.

Similarly, in a case where the above operation is an operation for forming a resin particle layer containing the crystalline resin particle, that is, in a case where a resin layer containing the crystalline resin is formed among the resin layers of the shell layer of the toner particle, for example, in addition to the amorphous resin particle dispersion, a crystalline resin particle dispersion liquid is added.

In a case where the above operation is an operation for forming a resin particle layer containing the colorant particle, that is, in a case where a resin layer containing the colorant is formed among the resin layers of the shell layer of the toner particle, for example, in addition to the amorphous resin particle dispersion, a colorant particle dispersion liquid is added.

The details of the releasing agent particle dispersion liquid, the crystalline resin particle dispersion liquid, and the colorant particle dispersion liquid used in the above operation are same as the details of the releasing agent particle dispersion liquid, the crystalline resin particle dispersion liquid, and the colorant particle dispersion liquid used in the production of the composite core particles described above.

The addition amount of the amorphous resin particle in each operation in the repeating step may be larger than the addition amount of the amorphous resin particle in an operation immediately preceding the each operation. Since the area of the coating target of the resin particle layer increases toward an outer side, it is considered that an amount of the amorphous resin particles required for forming the resin particle layer having the same thickness also increases. Therefore, it is considered that since the addition amount of the amorphous resin particles is increased, aggregated particles having a high coverage by the resin particle layer are obtained, and a toner giving high fine line reproducibility is obtained.

An increase ratio of the addition amount of the amorphous resin particle is not particularly limited, and for example, in a case where the addition amount of the amorphous resin particle in the formation of the innermost layer is A parts by mass and the addition amount of the amorphous resin particle in the formation of the outermost layer is B parts by mass, a value of the ratio B/A may be more than 1, and is preferably 1.2 or more and 10 or less, and more preferably 1.5 or more and 8 or less.

In the above operation, after the amorphous resin particle is added to the core particle dispersion liquid, the core particle and the amorphous resin particle are hetero-aggregated in the core particle dispersion liquid to which the amorphous resin particle dispersion is added, and a resin particle layer is formed on the surface of the core particle.

Specifically, for example, an aggregating agent is added to the core particle dispersion liquid in which the amorphous resin particle dispersion liquid is added, a pH of the dispersion liquid is adjusted to acidic (for example, a pH of 2 or more and 5 or less), and a dispersion stabilizer is added if necessary. Then, heating to a temperature (specifically, for example, a temperature being equal to or higher than "the glass transition temperature of amorphous resin particles minus 30° C." and a temperature being equal to or lower than "the glass transition temperature minus 10° C.") (hereinafter, also referred to as "aggregation temperature") of a glass transition temperature of the amorphous resin particle is performed to aggregate the particles dispersed in the mixed dispersion liquid, and then the resin particle layer is formed on the surface of the core particle.

In the resin particle layer forming step, for example, the aggregating agent may be added at room temperature (for example, 25° C.) while stirring the core particle dispersion liquid in which the amorphous resin particle is added with a rotary shear homogenizer, the pH of the mixed dispersion liquid may be adjusted to be acidic (for example, a pH of 2 or more and 5 or less), a dispersion stabilizer may be added as necessary, and then the above heating may be performed.

Details of the aggregating agent used in the resin particle layer forming step and additives that may be used as necessary are same as the details of the aggregating agent and additives used in the aggregating step in the production of the composite core particle described above.

In all operations in the resin particle layer forming step and in the repeating step, an aggregating agent may be added to the core particle dispersion liquid in addition to the amorphous resin particle.

For example, in the repeating step, in a case where the aggregating agent is already contained in the core particle dispersion liquid to which the amorphous resin particle dispersion liquid is added, the resin particle layer may be formed without adding the aggregating agent. On the other hand, by adding the aggregating agent in all operations in the resin particle layer forming step and in the repeating step, an appropriate concentration of the aggregating agent is maintained throughout all operations, and the coverage by the resin particle layer is easily increased.

The aggregation temperature in each operation in the repeating step may be higher than the aggregation temperature in an operation immediately preceding the each operation. Since the resin particle layer tends to become unstable toward the outside, stable aggregated particles of the resin particle layer are easily obtained by increasing the aggregation temperature.

The degree of temperature rise of the aggregation temperature is not particularly limited, and for example, in a case where the aggregation temperature for forming the innermost layer is E° C. and the aggregation temperature for forming the outermost layer is F° C., the difference "F-E" (° C.) may be 2° C. or more, and is preferably 4° C. or more and 15° C. or less, and more preferably 6° C. or more and 12° C. or less.

(Fusion and Coalescence Step)

Next, the aggregated particle dispersion liquid in which the aggregated particles are dispersed is heated to, for example, a temperature equal to or higher than the glass transition temperature of the amorphous resin particles (for example, a temperature higher than the glass transition temperature of the amorphous resin particles by 10° C. to 30° C.) to fuse and coalesce the aggregated particles to form the toner particles.

The toner particle is obtained through the above steps.

Here, after the fusion and coalescence step is completed, the toner particles formed in the solution are subjected to a common washing step, a solid-liquid separation step, and a drying step to obtain dried toner particles.

In the washing step, from the viewpoint of chargeability, replacement washing with ion exchange water may be sufficiently performed. The solid-liquid separation step is not particularly limited, and suction filtration, pressure filtration or the like may be performed from a viewpoint of productivity. The drying step is not particularly limited, and freeze-drying, air-flow drying, fluid-drying, vibration-type fluid-drying or the like may be performed from the viewpoint of productivity.

Then, the toner according to the exemplary embodiment is produced, for example, by adding an external additive to the obtained dried toner particles and performing mixing. The mixing may be performed by, for example, a V blender, a Henschel mixer, or a Loedige mixer. Further, if necessary, coarse particles in the toner may be removed by using a vibration sieving machine, a wind power sieving machine, or the like.

<Electrostatic Charge Image Developer>

The electrostatic charge image developer according to the exemplary embodiment includes at least the toner according to the exemplary embodiment.

The electrostatic charge image developer according to the exemplary embodiment may be a one-component developer containing only the toner according to the exemplary embodiment, or may be a two-component developer in which the toner and a carrier are mixed.

The carrier is not particularly limited, and examples thereof include common carriers. Examples of the carrier include a coated carrier in which a surface of a core made of a magnetic powder is coated with a coating resin; a magnetic powder dispersion-type carrier in which a magnetic powder is dispersed and blended in a matrix resin; and a resin impregnation-type carrier in which a porous magnetic powder is impregnated with a resin.

The magnetic powder dispersion-type carrier and the resin impregnation-type carrier may be carriers in which constituent particles of the carrier are core materials, and the core material is coated with a coating resin.

Examples of the magnetic powder include magnetic metals such as iron, nickel, and cobalt, and magnetic oxides such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin including an organosiloxane bond or a modified product thereof, a fluororesin, polyester, polycarbonate, a phenol resin, and an epoxy resin.

The coating resin and the matrix resin may contain other additives such as conductive particles.

Examples of the conductive particles include particles of metals such as gold, silver, or copper, and particles of carbon black, titanium oxide, zinc oxide, tin oxide, barium sulfate, aluminum borate, and potassium titanate.

Here, in order to coat surfaces of the core materials with the coating resin, a method of coating with a coating layer forming solution in which a coating resin and, if necessary, various additives are dissolved in an appropriate solvent is exemplified. The solvent is not particularly limited, and may be selected in consideration of the coating resin to be used, coating suitability, and the like.

Specific examples of the resin coating method include an immersion method in which the core material is immersed in the coating layer forming solution, a spray method in which the coating layer forming solution is sprayed onto the surfaces of the core materials, a fluidized bed method in which the coating layer forming solution is sprayed in a state in which the core material is floated by fluidized air, and a kneader coater method in which the core material of the carrier and the coating layer forming solution are mixed in a kneader coater and the solvent is removed.

A mixing ratio (mass ratio) of the toner to the carrier in the two-component developer may be toner:carrier=1:100 to 30:100, and is preferably 3:100 to 20:100.

<Image Forming Apparatus and Image Forming Method>

An image forming apparatus and an image forming method according to the exemplary embodiment will be described.

The image forming apparatus according to the exemplary embodiment includes: an image carrier; a charging unit that charges a surface of the image carrier; an electrostatic charge image forming unit that forms an electrostatic charge image on the surface of the charged image carrier; a developing unit that accommodates an electrostatic charge image developer and develops, by the electrostatic charge image developer, the electrostatic charge image formed on the surface of the image carrier as a toner image; a transfer unit that transfers the toner image formed on the surface of the image carrier on a surface of a recording medium; and a fixing unit that fixes the toner image transferred on the surface of the recording medium. Then, the electrostatic charge image developer according to the exemplary embodiment is used as the electrostatic charge image developer.

In the image forming apparatus according to the exemplary embodiment, an image forming method (an image forming method according to the exemplary embodiment) is performed, the image forming apparatus including: a charging step of charging the surface of the image carrier; an electrostatic charge image forming step of forming the electrostatic charge image on the charged surface of the image carrier; a developing step of developing, by the electrostatic charge image developer, the electrostatic charge image formed on the surface of the image carrier as a toner image; a transfer step of transferring the toner image formed on the surface of the image carrier to the surface of the recording medium; and a fixing step of fixing the toner image transferred to the surface of the recording medium.

As the image forming apparatus according to the exemplary embodiment, common image forming apparatus such as a direct transfer type apparatus that directly transfers the toner image formed on the surface of the image carrier to the recording medium, an intermediate transfer type apparatus that primarily transfers the toner image formed on the surface of the image carrier to a surface of an intermediate transfer body, and secondarily transfers the toner image transferred to the surface of the intermediate transfer body to the surface of the recording medium, an apparatus including a cleaning unit that cleans the surface of the image carrier after the transfer of the toner image and before the charging, and an apparatus including an erasing unit that erases the surface of the image carrier by irradiation with erasing light after the transfer of the toner image and before the charging, may be used.

In the case of an intermediate transfer type apparatus, the transfer unit includes, for example, an intermediate transfer body having a surface on which a toner image is transferred, a primary transfer unit that primarily transfers the toner image formed on the surface of the image carrier to the surface of the intermediate transfer body, and a secondary transfer unit that secondarily transfers the toner image transferred to the surface of the intermediate transfer body to the surface of the recording medium.

In the image forming apparatus according to the exemplary embodiment, for example, a portion including the developing unit may have a cartridge structure (process cartridge) that is detachable from the image forming apparatus. As the process cartridge, for example, a process cartridge including a developing unit that accommodates the electrostatic charge image developer according to the exemplary embodiment may be used.

Hereinafter, an example of the image forming apparatus according to the exemplary embodiment will be described, but the image forming apparatus is not limited thereto. The parts illustrated in the drawings will be described, and description of the other parts will be omitted.

FIG. 1 is a schematic configuration diagram illustrating the image forming apparatus according to the exemplary embodiment. The image forming apparatus illustrated in FIG. 1 includes first to fourth electrophotographic image forming units 10Y, 10M, 10C, and 10K (image forming units) that output images of respective colors of yellow (Y), magenta (M), cyan (C), and black (K) based on image data subjected to color separation. These image forming units (hereinafter, may also be simply referred to as "units") 10Y, 10M, 10C, and 10K are arranged side by side in a horizontal direction at a preset distance from each other. These units 10Y, 10M, 10C, and 10K may be process cartridges that are detachable from the image forming apparatus.

Above the units 10Y, 10M, 10C, and 10K in the drawing, an intermediate transfer belt 20 (an example of the intermediate transfer body) as the intermediate transfer body extends through respective units. The intermediate transfer belt 20 is provided by being wound around a drive roll 22 and a support roll 24 in contact with an inner surface of the intermediate transfer belt 20, which are disposed to be separated from each other from the left to the right in the drawing, and travels in a direction from the first unit 10Y to the fourth unit 10K. A force is applied to the support roll 24 in a direction away from the drive roll 22 by a spring or the like (not illustrated), and tension is applied to the intermediate transfer belt 20 wound around the support roll 24 and the drive roll 22. An intermediate transfer body cleaning device 30 is provided on an image carrier side surface of the intermediate transfer belt 20 so as to face the drive roll 22.

Yellow, magenta, cyan, and black toners stored in toner cartridges 8Y, 8M, 8C, and 8K are supplied to developing devices 4Y, 4M, 4C, and 4K (developing unit) of the units 10Y, 10M, 10C, and 10K, respectively.

Since the first to fourth units 10Y, 10M, 10C, and 10K have the same configuration, here, the first unit 10Y that is arranged on an upstream side in the traveling direction of the intermediate transfer belt and forms a yellow image, will be described as a representative. Portions equivalent to those of the first unit 10Y are denoted by adding reference numerals with magenta (M), cyan (C), and black (K) instead of yellow (Y), and descriptions of the second to fourth units 10M, 10C, and 10K are omitted. 1M, 1C, and 1K in the second to fourth units 10M, 10C, and 10K are photoconductors corresponding to a photoconductor 1Y in the first unit 10Y; 2M, 2C and 2K are charging rolls corresponding to a charging roll 2Y; 3M, 3C, and 3K are laser beams corresponding to a laser beam 3Y; and 6M, 6C, and 6K are photoconductor cleaning devices corresponding to a photoconductor cleaning device 6Y.

The first unit 10Y includes the photoconductor 1Y (an example of the image carrier) that acts as an image carrier. Around the photoconductor 1Y, the following members are disposed in the following order: the charging roll 2Y (an example of the charging unit) that charges a surface of the photoconductor 1Y to a preset potential; an exposure device 3 (an example of the electrostatic charge image forming unit) that exposes the charged surface with the laser beam 3Y based on a color-separated image signal to form an electrostatic charge image; the developing device 4Y (an example of the developing unit) that supplies a charged toner to the electrostatic charge image to develop the electrostatic charge image; a primary transfer roll 5Y (an example of the primary transfer unit) that transfers the developed toner image onto the intermediate transfer belt 20; and the photoconductor cleaning device 6Y (an example of the cleaning unit) that removes the toner remaining on the surface of the photoconductor 1Y after the primary transfer.

The primary transfer roll 5Y is disposed inside the intermediate transfer belt 20 and is provided at a position facing the photoconductor 1Y. A bias power source (not illustrated) for applying a primary transfer bias is connected to each of the primary transfer rolls 5Y, 5M, 5C, and 5K. Each bias power source can change a transfer bias applied to each primary transfer roll under the control of a controlling unit (not illustrated).

Hereinafter, an operation of forming a yellow image in the first unit 10Y will be described.

First, prior to the operation, the surface of the photoconductor 1Y is charged to a potential of −600 V to −800 V by using the charging roll 2Y.

The photoconductor 1Y is formed by laminating a photoconductive layer on a conductive substrate (for example, having a volume resistivity at 20° C. being $1\times10^{-6}$ Ω·cm or less). The photoconductive layer usually has high resistance (resistance of general resin), but, has characteristics that when irradiated with a laser beam 3Y, the specific resistance of the portion irradiated with the laser beam changes. Therefore, the laser beam 3Y is output to the charged surface of the photoconductor 1Y via the exposure device 3 in accordance with yellow image data sent from the controller (not illustrated). The photosensitive layer on the surface of the photoconductor 1Y is irradiated with the laser beam 3Y, and accordingly, an electrostatic charge image having a yellow image pattern is formed on the surface of the photoconductor 1Y.

The electrostatic charge image is an image formed on the surface of the photoconductor 1Y by charging, and is a so-called negative latent image formed by lowering the specific resistance of the portion of the photoconductive layer irradiated with the laser beam 3Y to allow charges on the surface of the photoconductor 1Y to flow and by, on the other hand, leaving charges of a portion not irradiated with the laser beam 3Y.

The electrostatic charge image formed on the photoconductor 1Y rotates to a preset developing position by travelling of the photoconductor 1Y. Then, at this developing position, the electrostatic charge image on the photoconductor 1Y is visualized (developed) as a toner image by the developing device 4Y.

In the developing device 4Y, for example, an electrostatic charge image developer containing at least a yellow toner and a carrier is accommodated. The yellow toner is triboelectrically charged by being stirred inside the developing device 4Y, and has charges of the same polarity (negative polarity) as the charge on the photoconductor 1Y and is carried on a developer roll (an example of a developer carrier). Then, when the surface of the photoconductor 1Y passes through the developing device 4Y, the yellow toner electrostatically adheres to an erased latent image portion on the surface of the photoconductor 1Y, and the latent image is developed by the yellow toner. The photoconductor 1Y on which the yellow toner image is formed continuously travels at a preset speed, and the toner image developed on the photoconductor 1Y is conveyed to a preset primary transfer position.

When the yellow toner image on the photoconductor 1Y is conveyed to the primary transfer position, a primary transfer bias is applied to the primary transfer roll 5Y, an electrostatic force from the photoconductor 1Y to the primary transfer roll 5Y acts on the toner image, and the toner image on the photoconductor 1Y is transferred to the intermediate transfer belt 20. The transfer bias applied at this time has a polarity (+) opposite to the polarity (−) of the toner, and is controlled to +10 μA by the controller (not illustrated), for example, in the first unit 10Y.

On the other hand, the toner remaining on the photoconductor 1Y is removed and collected by the photoconductor cleaning device 6Y.

The primary transfer bias applied to each of the primary transfer rolls 5M, 5C, and 5K of the second unit 10M and the subsequent units is also controlled in the same manner as in the first unit.

In this way, the intermediate transfer belt 20 to which the yellow toner image is transferred by the first unit 10Y is sequentially conveyed through the second to fourth units 10M, 10C, and 10K, and the toner images of the respective colors are superimposed and transferred in a multiple manner.

The intermediate transfer belt 20 onto which the toner images of four colors are transferred in a multiple manner through the first to fourth units arrives at a secondary transfer unit including the intermediate transfer belt 20, the support roll 24 in contact with the inner surface of the intermediate transfer belt, and a secondary transfer roll 26 (an example of the secondary transfer unit) disposed on the image carrying surface side of the intermediate transfer belt 20. On the other hand, a recording sheet P (an example of the recording medium) is fed through a supply mechanism to a gap where the secondary transfer roll 26 and the intermediate transfer belt 20 are in contact with each other at a preset timing, and a secondary transfer bias is applied to the support roll 24. The transfer bias applied at this time has the same polarity (−) as the toner polarity (−). The electrostatic force from the intermediate transfer belt 20 to the recording sheet P acts on the toner image, and the toner image on the intermediate transfer belt 20 is transferred to the recording sheet P. The secondary transfer bias at this time is determined based on the resistance detection by a resistance detection unit (not illustrated) that detects the resistance of the secondary transfer unit, and is controlled by voltage.

Thereafter, the recording sheet P is sent to a pressure-contacting portion (nip portion) of a pair of fixing rolls in a fixing device 28 (an example of the fixing unit), the toner image is fixed to the recording sheet P, thereby forming a fixed image.

Examples of the recording sheet P onto which the toner image is transferred include plain paper for use in electrophotographic copiers and printers. As the recording medium, in addition to the recording sheet P, an OHP sheet or the like may be used.

In order to further improve smoothness of an image surface after fixing, the surface of the recording sheet P may also be smooth. For example, coating paper obtained by coating the surface of the plain paper with a resin or the like, art paper for printing, or the like may be used.

The recording sheet P, on which the fixing of the color image is completed, is discharged toward a discharge unit, and a series of color image forming operations is completed.

<Process Cartridge and Toner Cartridge>

The process cartridge according to the exemplary embodiment will be described.

The process cartridge according to the exemplary embodiment includes a developing unit that accommodates the electrostatic charge image developer according to the exemplary embodiment and develops, by the electrostatic charge image developer, the electrostatic charge image formed on the surface of the image carrier as the toner image, and is detachable from the image forming apparatus.

The process cartridge according to the exemplary embodiment is not limited to the above configuration, and may be configured to include a developing unit and, if necessary, at least one selected from other units such as an image carrier, a charging unit, an electrostatic charge image forming unit, and a transfer unit.

Hereinafter, an example of the process cartridge according to the exemplary embodiment will be shown, but the process cartridge is not limited thereto. The parts illustrated in the drawings will be described, and description of the other parts will be omitted.

Figure 2:
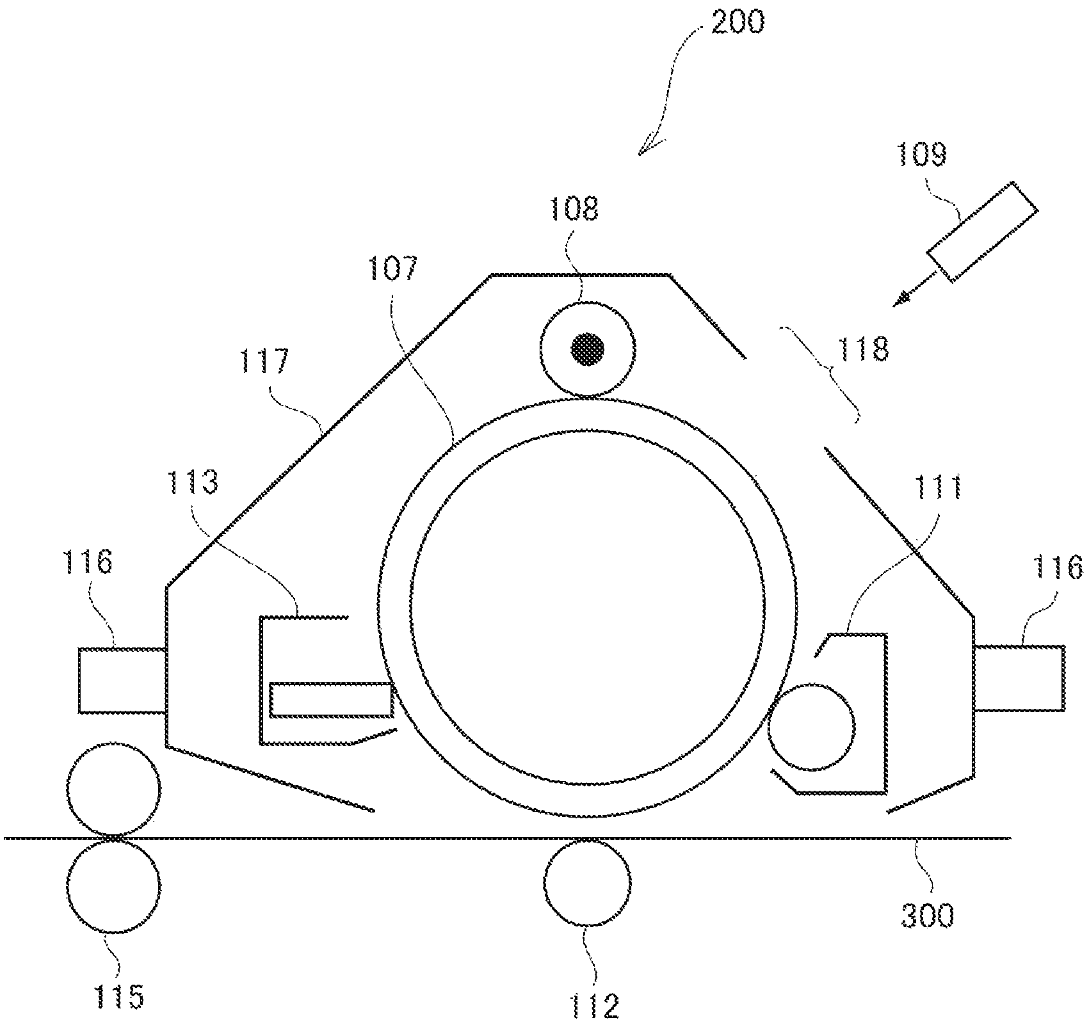
FIG. 2 is a schematic configuration diagram showing a process cartridge according to the exemplary embodiment.

FIG. 2 is a schematic configuration diagram illustrating the process cartridge according to the exemplary embodiment.

A process cartridge 200 illustrated in FIG. 2 is configured as a cartridge by, for example, integrally combining and holding a photoconductor 107 (an example of the image carrier), a charging roll 108 (an example of the charging unit), an image developing device 111 (an example of the developing unit), and a photoconductor cleaning device 113 (an example of the cleaning unit), each provided around the photoconductor 107 by a housing 117 having a mounting rail 116 and an opening 118 for exposure.

In FIG. 2, the reference numeral 109 denotes an exposure device (an example of the electrostatic charge image forming unit), the reference numeral 112 denotes a transfer device (an example of the transfer unit), the reference numeral 115 denotes a fixing device (an example of the fixing unit), and the reference numeral 300 denotes recording sheet (an example of the recording medium).

Next, the toner cartridge according to the exemplary embodiment will be described. The toner cartridge according to the exemplary embodiment accommodates the toner according to the exemplary embodiment and is detachable from the image forming apparatus. The toner cartridge accommodates a toner for replenishment to be supplied to the developing unit provided in the image forming apparatus.

The image forming apparatus illustrated in FIG. 1 is an image forming apparatus having a configuration in which the toner cartridges 8Y, 8M, 8C, and 8K are detachable, and the developing devices 4Y, 4M, 4C, and 4K are connected to toner cartridges corresponding to the respective developing devices (colors) by toner supply pipes (not illustrated). In a case where an amount of the toner accommodated in the toner cartridge decreases, the toner cartridge is replaced.

EXAMPLES

Hereinafter, although examples will be described, the present invention is not limited to the examples at all. In the following description, all "parts" and "%" are based on mass unless otherwise specified.

<Preparation of Each Particle Dispersion Liquid>

<Preparation of Brilliant Pigment Dispersion Liquid>

Brilliant pigment (paste of aluminum pigment, 2173EA of Toyo Aluminum, number average particle diameter 6.3 μm, average length in long axis direction 5.8 μm, aspect ratio 52); 100 parts Anionic surfactant (NEOGEN R manufactured by Daiichi Kogyo Seiyaku Co., Ltd.): 1.5 parts Ion exchange water: 900 parts After the solvent is removed from the paste of the aluminum pigment, the above materials are mixed, and a dispersion treatment is performed for 1 hour by an emulsification disperser (CAVITRON CR1010 manufactured by Pachoto Machinery & Engineering Co., Ltd.) to obtain a brilliant pigment dispersion liquid (solid content concentration: 10 mass %).

<Preparation of Light-emitting Particle Dispersion Liquid>

Light-emitting particles (phosphorescent pigment, manufactured by Nemoto Special Chemical Co., Ltd., product number: LumiNova Effect Green N-FF, volume average particle diameter: 3.2 number average particle diameter: 2.9 μm): 100 parts Anionic surfactant (NEOGEN R manufactured by Daiichi Kogyo Seiyaku Co., Ltd.): 1.5 parts Ion exchange water: 900 parts The above materials are mixed, and a dispersion treatment is performed for 1 hour by an emulsification disperser (CAVITRON CR1010 manufactured by Pachoto Machinery & Engineering Co., Ltd.) to obtain a light-emitting particle dispersion liquid (solid content concentration: 10 mass %).

<Preparation of Amorphous Polyester Resin Particle Dispersion Liquid (1)>

80 parts by mole of polyoxypropylene (2,2)-2,2-bis(4-hydroxyphenyl)propane, 10 parts by mole of ethylene glycol, 10 parts by mole of cyclohexanediol, 80 parts by mole of terephthalic acid, 10 parts by mole of isophthalic acid, and 10 parts by mole of n-dodecenylsuccinic acid are put into a reaction vessel equipped with a stirrer, a thermometer, a condenser, and a nitrogen gas inlet tube, and an inside of the reaction vessel is replaced with dry nitrogen gas. Thereafter, 0.25 parts by mass of titanium tetrabutoxide is added as a catalyst to 100 parts by mass of the monomer components. In a nitrogen gas stream, the mixture is stirred and reacted at 170° C. for 3 hours, the temperature is further increased to 210° C. over 1 hour, the pressure in the reaction vessel is reduced to 3 kPa, and the mixture is stirred and reacted under reduced pressure for 13 hours to obtain an amorphous polyester resin (1) having a weight average molecular weight of 5,320 and a glass transition temperature of 60.1° C.

Next, 200 parts by mass of the amorphous polyester resin (1), 100 parts by mass of methyl ethyl ketone, and 70 parts by mass of isopropyl alcohol are put into a 3-liter reaction vessel with a jacket (BJ-30N, manufactured by Tokyo Rikakikai Co., Ltd.) equipped with a condenser, a thermometer, a water droplet undertaking device, and an anchor blade, and the resin is dissolved while stirring and mixing at 100 rpm while maintaining the temperature at 70° C. in a water circulation type thermostatic vessel. Thereafter, the stirring rotation speed is set to 150 rpm, the water circulation type thermostatic vessel is set to 66° C., 10 parts by mass of 10 mass % ammonia water (reagent) is added over 10 minutes, and then 600 parts by mass in total of ion exchange water kept at 66° C. is dropped at a rate of 5 parts by mass/min to perform phase inversion, thereby obtaining an emulsion.

600 parts of the obtained emulsion and 525 parts by mass of ion exchange water are put into a 2-liter eggplant flask, and set in an evaporator (manufactured by Tokyo Rikakikai Co., Ltd.) equipped with a vacuum control unit through a trap ball. The eggplant flask is heated in a hot water bath at 60° C. while being rotated, and the pressure is reduced to 7 kPa while paying attention to bumping to remove the solvent. When the recovered solvent amount reaches 825 parts by mass, the pressure is returned to normal pressure, and the eggplant flask is cooled with water to obtain a dispersion liquid in which resin particles having a volume average particle diameter of 160 nm are dispersed. Ion exchange water is added to obtain an amorphous polyester resin particle dispersion liquid (1) having a solid content concentration of 20 mass %.

<Preparation of Amorphous Polyester Resin Particle Dispersion Liquid (2)>

30 parts by mole of polyoxypropylene (2,2)-2,2-bis(4-hydroxyphenyl)propane, 70 parts by mole of ethylene glycol, 20 parts by mole of cyclohexanediol, 80 parts by mole of terephthalic acid, 20 parts by mole of isophthalic acid, and 20 parts by mole of n-dodecenylsuccinic acid are put into a reaction vessel equipped with a stirrer, a thermometer, a condenser, and a nitrogen gas inlet tube, and an inside of the reaction vessel is replaced with dry nitrogen gas. Thereafter, 0.25 parts by mass of titanium tetrabutoxide is added as a catalyst to 100 parts by mass of the monomer components. In a nitrogen gas stream, the mixture is stirred and reacted at 170° C. for 3 hours, the temperature is further increased to 210° C. over 1 hour, the pressure in the reaction vessel is reduced to 3 kPa, and the mixture is stirred and reacted under reduced pressure for 13 hours to obtain an amorphous polyester resin (2) having a weight average molecular weight of 8,130 and a glass transition temperature of 56.1° C.

Next, 200 parts by mass of the amorphous polyester resin (2), 100 parts by mass of methyl ethyl ketone, and 70 parts by mass of isopropyl alcohol are put into a 3-liter reaction vessel with a jacket (BJ-30N, manufactured by Tokyo Rikakikai Co., Ltd.) equipped with a condenser, a thermometer, a water droplet undertaking device, and an anchor blade, and the resin is dissolved while stirring and mixing at 100 rpm while maintaining the temperature at 70° C. in a water circulation type thermostatic vessel. Thereafter, the stirring rotation speed is set to 150 rpm, the water circulation type thermostatic vessel is set to 66° C., 10 parts by mass of 10 mass % ammonia water (reagent) is added over 10 minutes, and then 600 parts by mass in total of ion exchange water kept at 66° C. is dropped at a rate of 5 parts by mass/min to perform phase inversion, thereby obtaining an emulsion.

600 parts of the obtained emulsion and 525 parts by mass of ion exchange water are put into a 2-liter eggplant flask, and set in an evaporator (manufactured by Tokyo Rikakikai Co., Ltd.) equipped with a vacuum control unit through a trap ball. The eggplant flask is heated in a hot water bath at 60° C. while being rotated, and the pressure is reduced to 7 kPa while paying attention to bumping to remove the solvent. When the recovered solvent amount reaches 825 parts by mass, the pressure is returned to normal pressure, and the eggplant flask is cooled with water to obtain a dispersion liquid in which resin particles having a volume average particle diameter of 165 nm are dispersed. Ion exchange water is added to obtain an amorphous polyester resin particle dispersion liquid (2) having a solid content concentration of 20 mass %.

<Preparation of Amorphous Polyester Resin Particle Dispersion Liquid (3)>

Ethylene oxide 2-mol adduct of bisphenol A: 20 mol %
Propylene oxide 2-mol adduct of bisphenol A: 30 mol %
Terephthalic acid: 30 mol %
Dodecenyl succinic acid anhydride: 10 mol %
Trimellitic acid anhydride: 10 mol %

Charging the monomer components into a reaction vessel equipped with a stirrer, a thermometer, a condenser, and a nitrogen gas inlet tube, after replacing the inside of the reaction vessel with dry nitrogen gas, as a catalyst, 1.0% of dibutyltin oxide is added to the total amount of the monomer components, and the mixture is stirred and reacted for 6 hours at about 190° C. under a nitrogen gas stream, further, the temperature is raised to 240° C. and the mixture is stirred and reacted for 6 hours, and then the pressure in the reaction vessel is reduced to 10.0 mmHg, and the mixture is stirred and reacted for 0.5 hours under reduced pressure to obtain an amorphous polyester resin (3) having a weight average molecular weight of 9,430 and a glass transition temperature of 65° C.

Next, 200 parts by mass of the amorphous polyester resin (3), 100 parts by mass of methyl ethyl ketone, and 70 parts by mass of isopropyl alcohol are put into a 3-liter reaction vessel with a jacket (BJ-30N, manufactured by Tokyo Rikakikai Co., Ltd.) equipped with a condenser, a thermometer, a water droplet undertaking device, and an anchor blade, and the resin is dissolved while stirring and mixing at 100 rpm while maintaining the temperature at 70° C. in a water circulation type thermostatic vessel. Thereafter, the stirring rotation speed is set to 150 rpm, the water circulation type thermostatic vessel is set to 66° C., 10 parts by mass of 10 mass % ammonia water (reagent) is added over 10 minutes, and then 600 parts by mass in total of ion exchange water kept at 66° C. is dropped at a rate of 5 parts by mass/min to perform phase inversion, thereby obtaining an emulsion.

600 parts of the obtained emulsion and 525 parts by mass of ion exchange water are put into a 2-liter eggplant flask, and set in an evaporator (manufactured by Tokyo Rikakikai Co., Ltd.) equipped with a vacuum control unit through a trap ball. The eggplant flask is heated in a hot water bath at 60° C. while being rotated, and the pressure is reduced to 7 kPa while paying attention to bumping to remove the solvent. When the recovered solvent amount reaches 825 parts by mass, the pressure is returned to normal pressure, and the eggplant flask is cooled with water to obtain a dispersion liquid in which resin particles having a volume average particle diameter of 163 nm are dispersed. Ion exchange water is added to obtain an amorphous polyester resin particle dispersion liquid (3) having a solid content concentration of 20 mass %.

<Preparation of Crystalline Polyester Resin Particle Dispersion Liquid>

1,10-decanedicarboxylic acid: 260 parts by mass
1,6-hexanediol: 167 parts by mass
Dibutyltin oxide (catalyst): 0.3 parts by mass The above materials are put into a heated and dried three-neck flask, air in the three-neck flask is replaced with nitrogen gas to make an inert atmosphere, and stirring and refluxing are performed at 180° C. for 5 hours by mechanical stirring. Subsequently, the temperature is gradually increased to 230° C. under a reduced pressure, the mixture is stirred for 2 hours, and when the mixture is in a viscous state, air cooling is performed to stop the reaction. In this way, a crystalline polyester resin having a weight average molecular weight of 12,600 and a melting temperature of 73° C. is obtained.

90 parts of the crystalline polyester resin, 1.8 parts of an anionic surfactant (Tayca Power, manufactured by Tayca Corporation), and 210 parts of ion exchange water are mixed, heated to 120° C., dispersed by using a homogenizer (Ultra Turrax T50, manufactured by IKA-Werke), and then subjected to a dispersion treatment for 1 hour by using a pressure-discharge-type Gaulin homogenizer to obtain a resin particle dispersion liquid in which resin particles having a volume average particle diameter of 160 nm are dispersed. Ion exchange water is added to the resin particle dispersion liquid to adjust a solid content to 20 mass %, thereby obtaining a crystalline polyester resin particle dispersion liquid.

<Preparation of Releasing Agent Particle Dispersion Liquid>

Paraffin wax (FNP 92 manufactured by Nippon Seiro Co., Ltd., Heat absorption peak onset: 81° C.): 45 parts by mass
Anionic surfactant (NEOGEN RK manufactured by Daiichi Kogyo Seiyaku Co., Ltd.): 5 parts by mass
Ion exchange water: 200 parts by mass The above materials are mixed and heated to 95° C. and dispersed using the homogenizer (ULTRA-TURRAX T50 manufactured by IKA-Werke).

Thereafter, the resultant is subjected to a dispersion treatment with a Manton Gaulin high-pressure homogenizer (manufactured by Gaulin Co., Ltd.) to prepare a releasing agent particle dispersion liquid (solid content concentration: 20 mass %) in which releasing agent particles are dispersed. A volume average particle diameter of the releasing agent particle is 0.19 μm.

<Preparation of Colorant Particle Dispersion Liquid>

Yellow pigment (HANSA BRILLIANT YELLOW 5GX03 (Pigment Yellow 74) manufactured by BASF): 98 parts by mass Anionic surfactant (NEOGEN R manufactured by Daiichi Kogyo Seiyaku Co., Ltd., neogen RK): 2 parts by mass Ion exchange water: 400 parts by mass The above components are mixed and dissolved, and dispersed for 10 minutes by a homogenizer (ULTRA-TURRAX, manufactured by IKA-Werke) to obtain a colorant particle dispersion liquid having a central particle diameter of 0.16 μm and a solid content of 20 mass %.

<Preparation of Toner>

Example 1

(Preparation of Core Particle Dispersion Liquid)

Amorphous Polyester Resin Particle Dispersion Liquid (1): 40 parts

Amorphous Polyester Resin Particle Dispersion Liquid (2): 40 parts

Crystalline Polyester Resin Particle Dispersion Liquid: 100 parts

Brilliant Pigment Dispersion Liquid: 500 parts

Releasing Agent Particle Dispersion Liquid: 60 parts

Anionic surfactant (Igepal CA897): 1.40 parts

The above raw materials are put into a 2 L cylindrical stainless steel vessel (diameter: 30 cm), and a dispersion treatment is performed for 10 minutes while applying a shear force at 4000 rpm by a homogenizer (ULTRA-TURRAX T50 manufactured by IKA-Werke). Next, 0.56 parts of 10 mass % aqueous solution of polyaluminum chloride is gradually added dropwise, and the mixture is dispersed for 15 minutes at a rotation speed of the homogenizer of 5000 rpm to obtain a raw material dispersion liquid.

Next, the raw material dispersion liquid is transferred to a polymerization vessel equipped with a stirrer having two paddles of stirring blades and a thermometer, heating is started with a mantle heater while stirring at a stirring rotation speed of 200 rpm, and the temperature is maintained at 54° C. for 2 hours to form composite core particles, thereby obtaining a composite core particle dispersion liquid in which the composite core particles are dispersed. At this time, the pH of the material dispersion liquid is controlled to be within the range of 2.2 to 3.5 with a 0.3N nitric acid aqueous solution or a 1N sodium hydroxide aqueous solution.

(Resin Particle Layer Forming Step)

Next, 100 parts of the amorphous polyester resin particle dispersion liquid (1) and 100 parts of the amorphous polyester resin particle dispersion liquid (2) are further added to the composite core particle dispersion liquid, and 0.47 parts of 10 mass % aqueous solution of polyaluminum chloride as an aggregating agent is gradually dropped to attach the amorphous resin particles to the surfaces of the composite core particles to form a resin particle layer. Next, the temperature is raised to 54° C., and the temperature is maintained for 0.5 hours while confirming the shape and size of the composite core particles on which the resin particle layer is formed with an optical microscope and Multisizer II (Beckman Coulter, Inc.).

(Repeating Step)

Next, 155 parts of the amorphous polyester resin particle dispersion liquid (1) and 155 parts of the amorphous polyester resin particle dispersion liquid (2) are further added to the dispersion liquid of the composite core particles in which one resin particle layer is formed, and 0.72 parts of 10 mass % aqueous solution of polyaluminum chloride as an aggregating agent is gradually dropped to form a resin particle layer to be an outermost layer. Next, the temperature is raised to 60° C., and the temperature is maintained for 0.5 hours while confirming the shape and size of the composite core particles on which the resin particle layer is formed with an optical microscope and Multisizer II (Beckman Coulter, Inc.), and thereby the aggregated particle dispersion liquid in which the aggregated particles are dispersed is obtained.

(Fusion and Coalescence Step)

Next, the pH is increased to 8.0, the temperature is increased to 80.0° C., the aggregated particles are fused, the pH is decreased to 6.0 while maintaining the temperature at 80.0° C., heating is stopped after 1 hour, and cooling is performed at a cooling rate of 0.1° C./min. Next, the resultant is sieved with a 20 μm mesh, repeatedly washed with water, and then dried with a vacuum dryer to obtain toner particles (1). A volume average particle diameter of the toner particles (1) is 10.0

The obtained toner particles (1) are toner particles in which a shell layer composed of two resin layers of an innermost layer made of an amorphous resin and an outermost layer made of an amorphous resin is formed on the surface of a composite core particle. The mass of the entire shell layer is 105 parts by mass relative to 100 parts by mass of the core particles, and the thickness of the entire shell layer is 1.3

The number of the brilliant pigments contained in one composite core particle is 3.4 on average, and the content of the brilliant pigment relative to a whole of the composite core particle is 51 mass %.

(Preparation of External Added Toner)

100 parts of the obtained toner particles (1) and 1.5 parts of hydrophobic silica (RY50 of Nippon Aerosil Co., Ltd.) are mixed with a Henschel mixer at a peripheral speed of 33 m/s for 2 minutes. Then, a mixture is sieved with a vibrating sieve having an opening of 45 μm to obtain an externally added toner (1).

Example 2

(Preparation of Core Particle Dispersion Liquid)

As the single core particle dispersion liquid, the brilliant pigment dispersion liquid is used as it is.

(Resin Particle Layer Forming Step)

100 parts of the amorphous polyester resin particle dispersion liquid (1), 100 parts of the amorphous polyester resin particle dispersion liquid (2), 60 parts of the releasing agent particle dispersion liquid, 100 parts of the crystalline polyester resin particle dispersion liquid are added to 500 parts of the brilliant pigment dispersion liquid which is a single core particle dispersion liquid, and as an aggregating agent, 0.84 parts of 10 mass % aqueous solution of polyaluminum chloride is gradually added dropwise to cause the amorphous resin particles, the releasing agent particles, and the crystalline resin particles to adhere to the surfaces of the single core particles, thereby forming a resin particle layer. Next, the temperature is raised to 54° C., and the temperature is maintained for 0.5 hours while confirming the shape and size of the single core particles on which the resin particle layer is formed with an optical microscope and Multisizer II (Beckman Coulter, Inc.).

(Repeating Step)

Next, 195 parts of the amorphous polyester resin particle dispersion liquid (1) and 195 parts of the amorphous polyester resin particle dispersion liquid (2) are further added to the dispersion liquid of the single core particles in which one resin particle layer is formed, and 0.91 parts of 10 mass % aqueous solution of polyaluminum chloride as an aggregating agent is gradually dropped to form a resin particle layer to be an outermost layer. Next, the temperature is raised to 60° C., and the temperature is maintained for 0.5 hours while confirming the shape and size of the single core particles on which the resin particle layer is formed with an optical microscope and Multisizer II (Beckman Coulter, Inc.), and thereby the aggregated particle dispersion liquid in which the aggregated particles are dispersed is obtained.

(Fusion and Coalescence Step)

Next, the pH is increased to 8.0, the temperature is increased to 80.0° C., the aggregated particles are fused, the pH is decreased to 6.0 while maintaining the temperature at 80.0° C., heating is stopped after 1 hour, and cooling is performed at a cooling rate of 0.1° C./min. Next, the resultant is sieved with a 20 μm mesh, repeatedly washed with water, and then dried with a vacuum dryer to obtain toner particles (2). A volume average particle diameter of the toner particle (2) is 10.2 μm.

The obtained toner particles (2) are toner particles in which a shell layer composed of two resin layers of an innermost layer made of an amorphous resin, a releasing agent, and a crystalline resin and an outermost layer made of an amorphous resin is formed on the surface of a single core particle. The mass of the entire shell layer is 300 parts by mass relative to 100 parts by mass of the core particles, and the thickness of the entire shell layer is 1.5 μm.

(Preparation of External Added Toner)

A toner (2) is obtained in the same manner as in the case of the toner (1) except that the toner particles (2) are used instead of the toner particles (1).

Example 3

(Preparation of Core Particle Dispersion Liquid)

As the single core particle dispersion liquid, the brilliant pigment dispersion liquid is used as it is.

(Resin Particle Layer Forming Step)

Next, 90 parts of the amorphous polyester resin particle dispersion liquid (1) and 90 parts of the amorphous polyester resin particle dispersion liquid (2) are added to 500 parts of the brilliant pigment dispersion liquid which is the single core particle dispersion liquid, and 0.42 parts of 10 mass % aqueous solution of polyaluminum chloride as the aggregating agent is gradually dropped to attach the amorphous resin particles to the surfaces of the composite core particles to form a resin particle layer. Next, the temperature is raised to 54° C., and the temperature is maintained for 0.5 hours while confirming the shape and size of the single core particles on which the resin particle layer is formed with an optical microscope and Multisizer II (Beckman Coulter, Inc.).

(Repeating Step)

Next, 100 parts of the amorphous polyester resin particle dispersion liquid (1), 100 parts of the amorphous polyester resin particle dispersion liquid (2) and 60 parts of the releasing agent particle dispersion liquid are further added to the dispersion liquid of the single core particles in which one resin particle layer is formed, and 0.61 parts of 10 mass % aqueous solution of polyaluminum chloride as an aggregating agent is gradually dropped to form a resin particle layer to be an intermediate layer. Next, the temperature is raised to 56° C., and the temperature is maintained for 0.5 hours while confirming the shape and size of the single core particles on which the resin particle layer is formed with an optical microscope and Multisizer II (Beckman Coulter, Inc.).

Next, 155 parts of the amorphous polyester resin particle dispersion liquid (1) and 155 parts of the amorphous polyester resin particle dispersion liquid (2) are further added to the dispersion liquid of the single core particles in which two resin particle layer is formed, and 0.72 parts of 10 mass % aqueous solution of polyaluminum chloride as an aggregating agent is gradually dropped to form a resin particle layer to be an outermost layer. Next, the temperature is raised to 58° C., and the temperature is maintained for 0.5 hours while confirming the shape and size of the single core particles on which the resin particle layer is formed with an optical microscope and Multisizer II (Beckman Coulter, Inc.), and thereby the aggregated particle dispersion liquid in which the aggregated particles are dispersed is obtained.

(Fusion and Coalescence Step)

Next, the pH is increased to 8.0, the temperature is increased to 80.0° C., the aggregated particles are fused, the pH is decreased to 6.0 while maintaining the temperature at 80.0° C., heating is stopped after 1 hour, and cooling is performed at a cooling rate of 0.1° C./min. Next, the resultant is sieved with a 20 μm mesh, repeatedly washed with water, and then dried with a vacuum dryer to obtain toner particles (3). A volume average particle diameter of the toner particle (3) is 10.1 μm.

The obtained toner particles (3) are toner particles in which a shell layer composed of three resin layers of an innermost layer made of an amorphous resin, an intermediate layer made of an amorphous resin and a releasing agent, and an outermost layer made of an amorphous resin is formed on the surface of a single core particle. The mass of the entire shell layer is 300 parts by mass relative to 100 parts by mass of the core particles, and the thickness of the entire shell layer is 1.4 μm.

(Preparation of External Added Toner)

A toner (3) is obtained in the same manner as in the case of the toner (1) except that the toner particles (3) are used instead of the toner particles (1).

Example 4

(Preparation of Core Particle Dispersion Liquid)

As the single core particle dispersion liquid, the brilliant pigment dispersion liquid is used as it is.

(Resin Particle Layer Forming Step)

Next, 90 parts of the amorphous polyester resin particle dispersion liquid (1) and 90 parts of the amorphous polyester resin particle dispersion liquid (2) are added to 500 parts of the brilliant pigment dispersion liquid which is the single core particle dispersion liquid, and 0.42 parts of 10 mass % aqueous solution of polyaluminum chloride as the aggregating agent is gradually dropped to attach the amorphous resin particles to the surfaces of the composite core particles to form a resin particle layer. Next, the temperature is raised to 54° C., and the temperature is maintained for 0.5 hours while confirming the shape and size of the single core particles on which the resin particle layer is formed with an optical microscope and Multisizer II (Beckman Coulter, Inc.).

(Repeating Step)

Next, 50 parts of the amorphous polyester resin particle dispersion liquid (1), 50 parts of the amorphous polyester resin particle dispersion liquid (2), 60 parts of the releasing agent particle dispersion liquid, and 100 parts of crystalline polyester resin particle dispersion liquid are further added to the dispersion liquid of the single core particles in which one resin particle layer is formed, and 0.61 parts of 10 mass % aqueous solution of polyaluminum chloride as an aggregating agent is gradually dropped to form a resin particle layer to be an intermediate layer. Next, the temperature is raised to 56° C., and the temperature is maintained for 0.5 hours while confirming the shape and size of the single core particles on which the resin particle layer is formed with an optical microscope and Multisizer II (Beckman Coulter, Inc.).

Next, 155 parts of the amorphous polyester resin particle dispersion liquid (1) and 155 parts of the amorphous polyester resin particle dispersion liquid (2) are further added to the dispersion liquid of the single core particles in which two resin particle layer is formed, and 0.72 parts of 10 mass % aqueous solution of polyaluminum chloride as an aggregating agent is gradually dropped to form a resin particle layer to be an outermost layer. Next, the temperature is raised to 58° C., and the temperature is maintained for 0.5 hours while confirming the shape and size of the single core particles on which the resin particle layer is formed with an optical microscope and Multisizer II (Beckman Coulter, Inc.), and thereby the aggregated particle dispersion liquid in which the aggregated particles are dispersed is obtained.

(Fusion and Coalescence Step)

Next, the pH is increased to 8.0, the temperature is increased to 67.5° C., the aggregated particles are fused, the pH is decreased to 6.0 while maintaining the temperature at 67.5° C., heating is stopped after 1 hour, and cooling is performed at a cooling rate of 0.1° C./min. Next, the resultant is sieved with a 20 μm mesh, repeatedly washed with water, and then dried with a vacuum dryer to obtain toner particles (4). A volume average particle diameter of the toner particle (4) is 10.3 μm.

The obtained toner particles (4) are toner particles in which a shell layer composed of three resin layers of an innermost layer made of an amorphous resin, an intermediate layer made of an amorphous resin, a releasing agent and a crystalline resin, and an outermost layer made of an amorphous resin is formed on the surface of a single core particle. The mass of the entire shell layer is 300 parts by mass relative to 100 parts by mass of the core particles, and the thickness of the entire shell layer is 1.3 μm.

(Preparation of External Added Toner)

A toner (4) is obtained in the same manner as in the case of the toner (1) except that the toner particles (4) are used instead of the toner particles (1).

Example 5

(Preparation of Core Particle Dispersion Liquid)

As the single core particle dispersion liquid, the brilliant pigment dispersion liquid is used as it is.

(Resin Particle Layer Forming Step)

Next, 90 parts of the amorphous polyester resin particle dispersion liquid (1) and 90 parts of the amorphous polyester resin particle dispersion liquid (2) are added to 500 parts of the brilliant pigment dispersion liquid which is the single core particle dispersion liquid, and 0.42 parts of 10 mass % aqueous solution of polyaluminum chloride as the aggregating agent is gradually dropped to attach the amorphous resin particles to the surfaces of the composite core particles to form a resin particle layer. Next, the temperature is raised to 54° C., and the temperature is maintained for 0.5 hours while confirming the shape and size of the single core particles on which the resin particle layer is formed with an optical microscope and Multisizer II (Beckman Coulter, Inc.).

(Repeating Step)

Next, 25 parts of the amorphous polyester resin particle dispersion liquid (1), 25 parts of the amorphous polyester resin particle dispersion liquid (2), 60 parts of the releasing agent particle dispersion liquid, 100 parts of crystalline polyester resin particle dispersion liquid, and 50 parts of colorant particle dispersion liquid are further added to the dispersion liquid of the single core particles in which one resin particle layer is formed, and 0.61 parts of 10 mass % aqueous solution of polyaluminum chloride as an aggregating agent is gradually dropped to form a resin particle layer to be an intermediate layer. Next, the temperature is raised to 56° C., and the temperature is maintained for 0.5 hours while confirming the shape and size of the single core particles on which the resin particle layer is formed with an optical microscope and Multisizer II (Beckman Coulter, Inc.).

Next, 155 parts of the amorphous polyester resin particle dispersion liquid (1) and 155 parts of the amorphous polyester resin particle dispersion liquid (2) are further added to the dispersion liquid of the single core particles in which two resin particle layer is formed, and 0.72 parts of 10 mass % aqueous solution of polyaluminum chloride as an aggregating agent is gradually dropped to form a resin particle layer to be an outermost layer. Next, the temperature is raised to 58° C., and the temperature is maintained for 0.5 hours while confirming the shape and size of the single core particles on which the resin particle layer is formed with an optical microscope and Multisizer II (Beckman Coulter, Inc.), and thereby the aggregated particle dispersion liquid in which the aggregated particles are dispersed is obtained.

(Fusion and Coalescence Step)

Next, the pH is increased to 8.0, the temperature is increased to 80.0° C., the aggregated particles are fused, the pH is decreased to 6.0 while maintaining the temperature at 80.0° C., heating is stopped after 1 hour, and cooling is performed at a cooling rate of 0.1° C./min. Next, the resultant is sieved with a 20 μm mesh, repeatedly washed with water, and then dried with a vacuum dryer to obtain toner particles (5). A volume average particle diameter of the toner particle (5) is 10.2 μm.

The obtained toner particles (5) are toner particles in which a shell layer composed of three resin layers of an innermost layer made of an amorphous resin, an intermediate layer made of an amorphous resin, a releasing agent, a crystalline resin and a colorant, and an outermost layer made of an amorphous resin is formed on the surface of a single core particle. The mass of the entire shell layer is 300 parts by mass relative to 100 parts by mass of the core particles, and the thickness of the entire shell layer is 1.7 μm.

(Preparation of External Added Toner)

A toner (5) is obtained in the same manner as in the case of the toner (1) except that the toner particles (5) are used instead of the toner particles (1).

Example 6

(Preparation of Core Particle Dispersion Liquid)

As the single core particle dispersion liquid, the brilliant pigment dispersion liquid is used as it is.

(Resin Particle Layer Forming Step)

Next, 50 parts of the amorphous polyester resin particle dispersion liquid (1) and 50 parts of the amorphous polyester resin particle dispersion liquid (2) are added to 500 parts of the brilliant pigment dispersion liquid which is the single core particle dispersion liquid, and 0.23 parts of 10 mass % aqueous solution of polyaluminum chloride as the aggregating agent is gradually dropped to attach the amorphous resin particles to the surfaces of the composite core particles to form a resin particle layer. Next, the temperature is raised to 52° C., and the temperature is maintained for 0.5 hours while confirming the shape and size of the single core particles on which the resin particle layer is formed with an optical microscope and Multisizer II (Beckman Coulter, Inc.).

(Repeating Step)

Next, 25 parts of the amorphous polyester resin particle dispersion liquid (1), 25 parts of the amorphous polyester resin particle dispersion liquid (2), 20 parts of the releasing agent particle dispersion liquid, 40 parts of crystalline polyester resin particle dispersion liquid, and 20 parts of colorant particle dispersion liquid are further added to the dispersion liquid of the single core particles in which one resin particle layer is formed, and 0.30 parts of 10 mass % aqueous solution of polyaluminum chloride as an aggregating agent is gradually dropped to form a resin particle layer to be a first intermediate layer. Next, the temperature is raised to 54° C., and the temperature is maintained for 0.5 hours while confirming the shape and size of the single core particles on which the resin particle layer is formed with an optical microscope and Multisizer II (Beckman Coulter, Inc.).

Next, 40 parts of the amorphous polyester resin particle dispersion liquid (1), 40 parts of the amorphous polyester resin particle dispersion liquid (2), 40 parts of the releasing agent particle dispersion liquid, 60 parts of crystalline polyester resin particle dispersion liquid, and 30 parts of colorant particle dispersion liquid are further added to the dispersion liquid of the single core particles in which two resin particle layers are formed, and 0.49 parts of 10 mass % aqueous solution of polyaluminum chloride as an aggregating agent is gradually dropped to form a resin particle layer to be a second intermediate layer. Next, the temperature is raised to 56° C., and the temperature is maintained for 0.5 hours while confirming the shape and size of the single core particles on which the resin particle layer is formed with an optical microscope and Multisizer II (Beckman Coulter, Inc.).

Next, 155 parts of the amorphous polyester resin particle dispersion liquid (1) and 155 parts of the amorphous polyester resin particle dispersion liquid (2) are further added to the dispersion liquid of the single core particles in which three resin particle layer is formed, and 0.72 parts of 10 mass % aqueous solution of polyaluminum chloride as an aggregating agent is gradually dropped to form a resin particle layer to be an outermost layer. Next, the temperature is raised to 58° C., and the temperature is maintained for 0.5 hours while confirming the shape and size of the single core particles on which the resin particle layer is formed with an optical microscope and Multisizer II (Beckman Coulter, Inc.), and thereby the aggregated particle dispersion liquid in which the aggregated particles are dispersed is obtained.

(Fusion and Coalescence Step)

Next, the pH is increased to 8.0, the temperature is increased to 80.0° C., the aggregated particles are fused, the pH is decreased to 6.0 while maintaining the temperature at 80.0° C., heating is stopped after 1 hour, and cooling is performed at a cooling rate of 0.1° C./min. Next, the resultant is sieved with a 20 μm mesh, repeatedly washed with water, and then dried with a vacuum dryer to obtain toner particles (6). A volume average particle diameter of the toner particle (6) is 10.1 μm.

The obtained toner particles (6) are toner particles in which a shell layer composed of four resin layers of an innermost layer made of an amorphous resin, a first intermediate layer made of amorphous resin, releasing agent, crystalline resin, and colorant, a second intermediate layer made of an amorphous resin, a releasing agent, a crystalline resin and a colorant, and an outermost layer made of an amorphous resin is formed on the surface of a single core particle. The mass of the entire shell layer is 300 parts by mass relative to 100 parts by mass of the core particles, and the thickness of the entire shell layer is 1.5 μm.

(Preparation of External Added Toner)

A toner (6) is obtained in the same manner as in the case of the toner (1) except that the toner particles (6) are used instead of the toner particles (1).

Example 7

(Preparation of Core Particle Dispersion Liquid)

As the single core particle dispersion liquid, the brilliant pigment dispersion liquid is used as it is.

(Resin Particle Layer Forming Step)

Next, 90 parts of the amorphous polyester resin particle dispersion liquid (1) and 90 parts of the amorphous polyester resin particle dispersion liquid (2) are added to 500 parts of the brilliant pigment dispersion liquid which is the single core particle dispersion liquid, and 0.42 parts of 10 mass % aqueous solution of polyaluminum chloride as the aggregating agent is gradually dropped to attach the amorphous resin particles to the surfaces of the composite core particles to form a resin particle layer. Next, the temperature is raised to 54° C., and the temperature is maintained for 0.5 hours while confirming the shape and size of the single core particles on which the resin particle layer is formed with an optical microscope and Multisizer II (Beckman Coulter, Inc.).

(Repeating Step)

Next, 50 parts of the amorphous polyester resin particle dispersion liquid (1), 50 parts of the amorphous polyester resin particle dispersion liquid (2), 60 parts of the releasing agent particle dispersion liquid, and 100 parts of crystalline polyester resin particle dispersion liquid are further added to the dispersion liquid of the single core particles in which one resin particle layer is formed, and 0.61 parts of 10 mass % aqueous solution of polyaluminum chloride as an aggregating agent is gradually dropped to form a resin particle layer to be an intermediate layer. Next, the temperature is raised to 56° C., and the temperature is maintained for 0.5 hours while confirming the shape and size of the single core particles on which the resin particle layer is formed with an optical microscope and Multisizer II (Beckman Coulter, Inc.).

Next, 310 parts of the amorphous polyester resin particle dispersion liquid (3) are further added to the dispersion liquid of the single core particles in which two resin particle layer is formed, and 0.72 parts of 10 mass % aqueous solution of polyaluminum chloride as an aggregating agent is gradually dropped to form a resin particle layer to be an outermost layer. Next, the temperature is raised to 58° C., and the temperature is maintained for 0.5 hours while confirming the shape and size of the single core particles on which the resin particle layer is formed with an optical microscope and Multisizer II (Beckman Coulter, Inc.), and thereby the aggregated particle dispersion liquid in which the aggregated particles are dispersed is obtained.

(Fusion and Coalescence Step)

Next, the pH is increased to 8.0, the temperature is increased to 80.0° C., the aggregated particles are fused, the pH is decreased to 6.0 while maintaining the temperature at 80.0° C., heating is stopped after 1 hour, and cooling is performed at a cooling rate of 0.1° C./min. Next, the resultant is sieved with a 20 μm mesh, repeatedly washed with water, and then dried with a vacuum dryer to obtain toner particles (7). A volume average particle diameter of the toner particle (7) is 10.2 μm.

The obtained toner particles (7) are toner particles in which a shell layer composed of three resin layers of an innermost layer made of an amorphous resin, an intermediate layer made of an amorphous resin, a releasing agent and a crystalline resin, and an outermost layer made of an amorphous resin is formed on the surface of a single core particle. The mass of the entire shell layer is 300 parts by mass relative to 100 parts by mass of the core particles, and the thickness of the entire shell layer is 1.3 μm.

(Preparation of External Added Toner)

A toner (7) is obtained in the same manner as in the case of the toner (1) except that the toner particles (7) are used instead of the toner particles (1).

Example 8

(Preparation of Core Particle Dispersion Liquid)

As the single core particle dispersion liquid, the light-emitting particle dispersion liquid is used as it is.

(Resin Particle Layer Forming Step)

Next, 90 parts of the amorphous polyester resin particle dispersion liquid (1) and 90 parts of the amorphous polyester resin particle dispersion liquid (2) are added to 500 parts of the light-emitting particle dispersion liquid which is the single core particle dispersion liquid, and 0.42 parts of 10 mass % aqueous solution of polyaluminum chloride as the aggregating agent is gradually dropped to attach the amorphous resin particles to the surfaces of the composite core particles to form a resin particle layer. Next, the temperature is raised to 54° C., and the temperature is maintained for 0.5 hours while confirming the shape and size of the single core particles on which the resin particle layer is formed with an optical microscope and Multisizer II (Beckman Coulter, Inc.).

(Repeating Step)

Next, 50 parts of the amorphous polyester resin particle dispersion liquid (1), 50 parts of the amorphous polyester resin particle dispersion liquid (2), 60 parts of the releasing agent particle dispersion liquid, and 100 parts of crystalline polyester resin particle dispersion liquid are further added to the dispersion liquid of the single core particles in which one resin particle layer is formed, and 0.61 parts of 10 mass % aqueous solution of polyaluminum chloride as an aggregating agent is gradually dropped to form a resin particle layer to be an intermediate layer. Next, the temperature is raised to 56° C., and the temperature is maintained for 0.5 hours while confirming the shape and size of the single core particles on which the resin particle layer is formed with an optical microscope and Multisizer II (Beckman Coulter, Inc.).

Next, 155 parts of the amorphous polyester resin particle dispersion liquid (1) and 155 parts of the amorphous polyester resin particle dispersion liquid (2) are further added to the dispersion liquid of the single core particles in which two resin particle layer is formed, and 0.72 parts of 10 mass % aqueous solution of polyaluminum chloride as an aggregating agent is gradually dropped to form a resin particle layer to be an outermost layer. Next, the temperature is raised to 58° C., and the temperature is maintained for 0.5 hours while confirming the shape and size of the single core particles on which the resin particle layer is formed with an optical microscope and Multisizer II (Beckman Coulter, Inc.), and thereby the aggregated particle dispersion liquid in which the aggregated particles are dispersed is obtained.

(Fusion and Coalescence Step)

Next, the pH is increased to 8.0, the temperature is increased to 80.0° C., the aggregated particles are fused, the pH is decreased to 6.0 while maintaining the temperature at 80.0° C., heating is stopped after 1 hour, and cooling is performed at a cooling rate of 0.1° C./min. Next, the resultant is sieved with a 20 μm mesh, repeatedly washed with water, and then dried with a vacuum dryer to obtain toner particles (8). A volume average particle diameter of the toner particles (8) is 9.9 μm.

The obtained toner particles (8) are toner particles in which a shell layer composed of three resin layers of an innermost layer made of an amorphous resin, an intermediate layer made of an amorphous resin, a releasing agent and a crystalline resin, and an outermost layer made of an amorphous resin is formed on the surface of a single core particle. The mass of the entire shell layer is 300 parts by mass relative to 100 parts by mass of the core particles, and the thickness of the entire shell layer is 1.1 μm.

(Preparation of External Added Toner)

A toner (8) is obtained in the same manner as in the case of the toner (1) except that the toner particles (8) are used instead of the toner particles (1).

Comparative Example 1

(Preparation of Core Particle Dispersion Liquid)

A composite core particle dispersion liquid in which composite core particles are dispersed is obtained in a similar manner as in Example 1.

(Resin Particle Layer Forming Step)

Next, 255 parts of the amorphous polyester resin particle dispersion liquid (1) and 255 parts of the amorphous polyester resin particle dispersion liquid (2) are further added to the composite core particle dispersion liquid, and 1.19 parts of 10 mass % aqueous solution of polyaluminum chloride as an aggregating agent is gradually dropped to attach the amorphous resin particles to the surfaces of the composite core particles to form a resin particle layer. Next, the temperature is raised to 58° C., and the temperature is maintained for 1.0 hour while confirming the shape and size of the composite core particles on which the resin particle layer is formed with an optical microscope and Multisizer II (Beckman Coulter, Inc.), and thereby the aggregated particle dispersion liquid in which the aggregated particles are dispersed is obtained.

(Fusion and Coalescence Step)

Next, the pH is increased to 8.0, the temperature is increased to 80.0° C., the aggregated particles are fused, the pH is decreased to 6.0 while maintaining the temperature at 80.0° C., heating is stopped after 1 hour, and cooling is performed at a cooling rate of 0.1° C./min. Next, the resultant is sieved with a 20 μm mesh, repeatedly washed with water, and then dried with a vacuum dryer to obtain toner particles (C1). A volume average particle diameter of the toner particles (C1) is 9.9 μm.

The obtained toner particle (C1) is a toner particle in which a shell layer made of only one resin layer made of an amorphous resin is formed on the surface of a composite core particle. The mass of the entire shell layer is 105 parts by mass relative to 100 parts by mass of the core particles, and the thickness of the entire shell layer is 1.1 μm.

The number of the brilliant pigments contained in one composite core particle is 3.7 on average, and the content of the brilliant pigment relative to a whole of the composite core particle is 51 mass %.

(Preparation of External Added Toner)

A toner (C1) is obtained in the same manner as in the case of the toner (1) except that the toner particles (C1) are used instead of the toner particles (1).

Comparative Example 2

(Preparation of Core Particle Dispersion Liquid)

As the single core particle dispersion liquid, the brilliant pigment dispersion liquid is used as it is.

(Resin Particle Layer Forming Step)

Next, 140 parts of the amorphous polyester resin particle dispersion liquid (1) and 140 parts of the amorphous polyester resin particle dispersion liquid (2) are added to 500 parts of the brilliant pigment dispersion liquid which is the single core particle dispersion liquid, and 0.65 parts of 10 mass % aqueous solution of polyaluminum chloride as the aggregating agent is gradually dropped to attach the amorphous resin particles to the surfaces of the composite core particles to form a resin particle layer. Next, the temperature is raised to 54° C., and the temperature is maintained for 0.5 hours while confirming the shape and size of the single core particles on which the resin particle layer is formed with an optical microscope and Multisizer II (Beckman Coulter, Inc.).

(Repeating Step)

Next, 155 parts of the amorphous polyester resin particle dispersion liquid (1), 155 parts of the amorphous polyester resin particle dispersion liquid (2), 60 parts of the releasing agent particle dispersion liquid, and 100 parts of crystalline polyester resin particle dispersion liquid are further added to the dispersion liquid of the single core particles in which one resin particle layer is formed, and 1.10 parts of 10 mass % aqueous solution of polyaluminum chloride as an aggregating agent is gradually dropped to form a resin particle layer to be an outermost layer. Next, the temperature is raised to 57° C., and the temperature is maintained for 0.5 hours while confirming the shape and size of the single core particles on which the resin particle layer is formed with an optical microscope and Multisizer II (Beckman Coulter, Inc.), and thereby the aggregated particle dispersion liquid in which the aggregated particles are dispersed is obtained.

(Fusion and Coalescence Step)

Next, the pH is increased to 8.0, the temperature is increased to 80.0° C., the aggregated particles are fused, the pH is decreased to 6.0 while maintaining the temperature at 80.0° C., heating is stopped after 1 hour, and cooling is performed at a cooling rate of 0.1° C./min. Next, the resultant is sieved with a 20 μm mesh, repeatedly washed with water, and then dried with a vacuum dryer to obtain toner particles (C2). A volume average particle diameter of the toner particle (C2) is 10.2 μm.

The obtained toner particles (C2) are toner particles in which a shell layer composed of two resin layers of an inner most layer made of an amorphous resin, and an outermost layer made of an amorphous resin, a releasing agent, and a crystalline resin is formed on the surface of a single core particle. The mass of the entire shell layer is 300 parts by mass relative to 100 parts by mass of the core particles, and the thickness of the entire shell layer is 1.9 μm.

(Preparation of External Added Toner)

A toner (C2) is obtained in the same manner as in the case of the toner (1) except that the toner particles (C2) are used instead of the toner particles (1).

The structures of the toners obtained in the above Examples and Comparative Examples are shown in Table 1. The content (mass %) of the resin single particles relative to the entire toner obtained in the above Examples and Comparative Examples is also shown in Table 1. In Table 1, "Composite" represents composite core particles, "Single" represents single core particles, "Amo" represents an amorphous resin, "WAX" represents a releasing agent, and "Cry" represents a crystalline resin.

<Evaluation>

<Preparation of Carrier>

100 parts by mass of ferrite particles (manufactured by Powdertech Co., Ltd., average particle diameter: 50 μm) and 1.5 parts by mass of a polymethyl methacrylate resin (manufactured by Mitsubishi Chemical Corporation, weight average molecular weight: 95,000, component ratio of weight average molecular weight of 10,000 or less: 5 mass %) are put into a pressure kneader together with 500 parts by mass of toluene, stirred and mixed at room temperature (25° C.) for 15 minutes, heated to 70° C. while mixing under reduced pressure to distill toluene, and then cooled, and classified using a sieve of 105 μm to obtain a resin-coated ferrite carrier.

<Preparation of Developer>

The obtained toner and the resin-coated ferrite carrier are mixed to prepare a developer having a toner concentration of 7 mass %.

<Evaluation of Fine Line Reproducibility>

"700 Digital Color Press" manufactured by Fuji Xerox Co., Ltd. is prepared, and the developer obtained in each of Examples and Comparative Examples is filled in the developing device. After standing for 12 hours in an environment of 5° C. and 20% RH, 100,000 sheets of a 1% print chart are formed on A4 paper in the same environment. At the initial stage (tenth sheet), after printing 1,000 sheets, 10,000 sheets, 50,000 sheets, and 100,000 sheets, and after standing for 72 hours after printing 100,000 sheets, 1on1off images (images in which 1 dot line is arranged in parallel at 1 dot interval) at a resolution of 2,400 dpi (dot per inch) are formed on an upper left, a center, and a lower right of A4 paper as a 5 cm×5 cm chart in a direction perpendicular to the developing direction. With respect to a line interval of each chart printed on the obtained sample, the presence or absence of a place narrowed due to scattering of toner or the like or a place widened due to thinning of a fine line is observed using a magnifying glass with ×100 times. From the observation results and the line intervals of the observed portions, grade evaluation is performed according to the following criteria. The results are shown in Table 2.

—Evaluation Criteria—

G1: In all the charts, there is no decrease in the line spacing due to scattering or no increase in the line spacing due to thinning of the fine line G2: Although a case where a decrease or an increase in the line interval is observed, there is at least one chart in which a fine line can be confirmed G3: When the interval between the fine lines cannot be determined or there is at least one chart in which the fine lines are missing G4: When the interval between the fine lines cannot be determined or there is at least two chart in which the fine lines are missing <Evaluation of Granularity>

The obtained developer is filled in a developing device of "color 800 press modified machine" manufactured by Fuji Xerox Co., Ltd. After filling with the developer, the developer is allowed to stand in an environment of 35° C. and 80% RH for 72 hours.

Using this modified machine, a patch image having a size of 20 mm×20 mm and a toner application amount of 4.0

$g/m^2$ is formed on J paper (basis weight: 82 $g/m^2$, manufactured by Fuji Xerox Co., Ltd.) in an environment of 35° C. and 80% RH at 10% intervals from an image density of 10% to 100%, and roughness is visually evaluated according to the following criteria. The results are shown in Table 2.

—Criteria—

G1: Granularity is not felt at all

G2: Granularity is slightly felt

G3: Granularity is felt and is not a problem

G4: Granularity is felt and there is a sense of discomfort

G5: Granularity is strongly felt

<Evaluation of Gloss Unevenness>

Using a modified machine of DocuCentre Color 400 (manufactured by Fuji Xerox Co., Ltd.) under an environment of a temperature of 28.5° C. and a humidity of 85%, forming an image having an image density of 100% on A4 size recording paper (manufactured by Fuji Xerox Co., Ltd., basis weight 64 $g/m^2$), using a gloss meter (BYK Microtri-Gloss Gloss Meter) (20+60+85°, manufactured by Gardner GmbH), and the 60-degree gloss is measured for 10 points. The gloss unevenness is evaluated from the difference (maximum value−minimum value) between the gloss levels at the ten points and the standard deviation.

Evaluation criteria are as follows. The results are shown in Table 2.

—Evaluation Criteria—

G1: The difference in gloss level is less than 5%, and the standard deviation of 10 gloss measurement points is 2 or less G2: The difference in gloss level is less than 5%, and the standard deviation of 10 gloss measurement points is more than 2

G3: The difference in gloss level is 5% or more and less than 7.5%

G4: The difference in gloss level is 7.5% or more and less than 10%

G5: The difference in gloss level is 10% or more

TABLE 1

| Toner | Core Particle | Large Diameter Particle | Number of Resin Layer | Innermost Layer | Intermediate Layer 1 | Intermediate Layer 2 | Outermost Layer | Resin Single Particle (% by number) |
|---|---|---|---|---|---|---|---|---|
| (1) | Composite | Brilliant | 2 | Amo | — | — | Amo | 76 |
| (2) | Single | Brilliant | 2 | Amo, WAX, Cry | — | — | Amo | 78 |
| (3) | Single | Brilliant | 3 | Amo | Amo, WAX | — | Amo | 45 |
| (4) | Single | Brilliant | 3 | Amo | Amo, WAX, Cry | — | Amo | 47 |
| (5) | Single | Brilliant | 3 | Amo | Amo, WAX, Cry, Pig | — | Amo | 49 |
| (6) | Single | Brilliant | 4 | Amo | Amo, WAX, Cry, Pig | Amo, WAX, Cry, Pig | Amo | 38 |
| (7) | Single | Brilliant | 3 | Amo | Amo, WAX, Cry | — | Amo | 46 |
| (8) | Single | Light-emitting | 3 | Amo | Amo, WAX, Cry | — | Amo | 47 |
| (C1) | Composite | Brilliant | 1 | — | — | — | Amo | 81 |
| (C2) | Single | Brilliant | 2 | Amo | — | — | Amo, WAX, Cry | 77 |

TABLE 2

| | Toner | Evaluation | | |
|---|---|---|---|---|
| | | Fine Line Reproducibility | Granularity | Gloss Unevenness |
| Example 1 | (1) | G3 | G3 | G3 |
| Example 2 | (2) | G3 | G3 | G3 |
| Example 3 | (3) | G2 | G2 | G2 |
| Example 4 | (4) | G2 | G2 | G2 |
| Example 5 | (5) | G2 | G2 | G2 |
| Example 6 | (6) | G1 | G1 | G1 |
| Example 7 | (7) | G2 | G2 | G2 |
| Example 8 | (8) | G2 | G2 | G2 |
| Comparative Example 1 | (C1) | G4 | G4 | G5 |
| Comparative Example 2 | (C2) | G3 | G5 | G4 |

From the above results, it is found that the toner in Examples has high fine line reproducibility as compared with the toner in Comparative Examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An electrostatic charge image developing toner comprising:

a toner particle including:

a core particle that contains a light-emitting particle having a number average particle diameter of 1 μm or more; and a shell layer that covers a surface of the core particle and includes at least three resin layers each containing an amorphous resin, wherein the at least three resin layers include:

an innermost layer consisting of the amorphous resin, an outermost layer consisting of the amorphous resin, and an intermediate layer that is a layer other than the innermost layer and the outermost layer of the at least three resin layers, and that includes a resin layer containing the amorphous resin, a releasing agent, and a crystalline resin.

2. The electrostatic charge image developing toner according to claim 1, wherein the core particle consists of one light-emitting particle being the light-emitting particle.

3. The electrostatic charge image developing toner according to claim 1, wherein the core particle contains at least two light-emitting particles each being the light-emitting particle, and an amorphous resin.

4. The electrostatic charge image developing toner according to claim 3, wherein a content of the light-emitting particles relative to a whole of the core particle is 50 mass % or more.

5. The electrostatic charge image developing toner according to claim 1, wherein a content of a resin single particle in the electrostatic charge image developing toner is equal to or less than 80% by number of a whole of the electrostatic charge image developing toner, the resin single particle containing an amorphous resin and not containing the light-emitting particle.

6. A method for producing an electrostatic charge image developing toner, comprising:

preparing a core particle dispersion liquid in which a core particle containing a large-diameter particle having a number average particle diameter of 1 μm or more is dispersed;

performing an operation of adding an amorphous resin particle to the core particle dispersion liquid and aggregating the core particle and the amorphous resin particle such that the amorphous resin particle adheres to the core particle, thereby forming a resin particle layer on a surface of the core particle;

repeating the operation at least one time, wherein only the amorphous resin particle is added as a particle added in the last operation, thereby forming an aggregated particle including at least two resin particle layers on the surface of the core particle, an outermost layer of the at least two resin particle layers consisting of the amorphous resin particle; and heating an aggregated particle dispersion liquid in which the aggregated particle is dispersed to fuse and coalesce the aggregated particle, thereby forming a toner particle.

7. The method for producing an electrostatic charge image developing toner according to claim 6, wherein the particle added in the forming of the resin particle layer is only the amorphous resin particle, and in the forming of the aggregated particle, the operation is further repeated at least two times in the repeating of the operation, and the particle added in at least one time of the operation excluding the last operation includes the amorphous resin particle and at least one selected from the group consisting of releasing agent particles, crystalline resin particles and colorant particles, and the aggregated particle including at least three resin particle layers is formed on the surface of the core particle, and an innermost layer of the at least three resin particle layers consists of the amorphous resin particle, and an intermediate layer that is a layer other than the outermost layer and the innermost layer of the at least three resin particle layers includes the amorphous resin particle and at least one selected from the group consisting of the releasing agent particles, the crystalline resin particles, and the colorant particles.

8. The method for producing an electrostatic charge image developing toner according to claim 6, wherein the large-diameter particle includes at least one selected from the group consisting of scaly particles and light-emitting particles.

9. The method for producing an electrostatic charge image developing toner according to claim 6, wherein the core particle consists of one large-diameter particle being the large-diameter particle.

10. The method for producing an electrostatic charge image developing toner according to claim 6, wherein the core particle contains at least two large-diameter particles each being the large-diameter particle, and an amorphous resin.

11. The method for producing an electrostatic charge image developing toner according to claim 10, wherein a content of the large-diameter particles relative to a whole of the core particle is 50 mass % or more.

12. The method for producing an electrostatic charge image developing toner according to claim 6, wherein in all operations in the forming of the resin particle layer and in the repeating of the operation, an aggregating agent is added to the core particle dispersion liquid in addition to the amorphous resin particle.

13. The method for producing an electrostatic charge image developing toner according to claim 6, wherein an aggregation temperature in each operation in the repeating of the operation is higher than an aggregation temperature in an operation immediately preceding the each operation.

14. The method for producing an electrostatic charge image developing toner according to claim 6, wherein an addition amount of the amorphous resin particle in each operation in the repeating of the operation is larger than an addition amount of the amorphous resin particle in an operation immediately preceding the each operation.

15. The electrostatic charge image developing toner according to claim 5, wherein the electrostatic charge image developing toner does not contain the resin single particle.

16. The electrostatic charge image developing toner according to claim 1, wherein the intermediate layer includes a colorant.

* * * * *